(12) United States Patent
So

(10) Patent No.: US 7,957,116 B2
(45) Date of Patent: Jun. 7, 2011

(54) SYSTEM AND METHOD FOR DETECTION OF MULTIPLE CURRENT LIMITS

(75) Inventor: John So, Fremont, CA (US)

(73) Assignee: Advanced Analogic Technologies, Inc., Santa Clara, CA (US)

( * ) Notice: Subject to any disclaimer, the term of this patent is extended or adjusted under 35 U.S.C. 154(b) by 686 days.

(21) Appl. No.: 11/752,101

(22) Filed: May 22, 2007

(65) Prior Publication Data
US 2008/0088290 A1   Apr. 17, 2008

Related U.S. Application Data

(60) Provisional application No. 60/829,307, filed on Oct. 13, 2006, provisional application No. 60/912,921, filed on Apr. 19, 2007.

(51) Int. Cl.
*H02H 9/08* (2006.01)
*H02H 3/08* (2006.01)
*H02H 9/02* (2006.01)

(52) U.S. Cl. ............. 361/93.9; 361/93.1; 361/93.2; 361/93.5; 361/93.7

(58) Field of Classification Search ........ 361/93.1–93.2, 361/93.5, 93.7, 93.9
See application file for complete search history.

(56) References Cited

U.S. PATENT DOCUMENTS

| | | | |
|---|---|---|---|
| 3,534,353 A * | 10/1970 | Calkin et al. ............... 340/664 |
| 3,859,591 A | 1/1975 | Saunders | |
| 3,892,929 A | 7/1975 | Shylo | |
| 4,649,455 A | 3/1987 | Scott | |
| 4,783,137 A | 11/1988 | Kosman et al. | |
| 4,788,620 A | 11/1988 | Scott | |
| 4,910,455 A | 3/1990 | Nadd | |
| 5,282,125 A | 1/1994 | Dhyanchand et al. | |
| 5,331,314 A | 7/1994 | Koch | |
| 5,506,493 A | 4/1996 | Stengel | |
| 5,955,915 A | 9/1999 | Edwards | |
| 6,130,813 A * | 10/2000 | Kates et al. ............... 361/93.1 |
| 6,163,708 A | 12/2000 | Groe | |
| 6,170,241 B1 | 1/2001 | Shibilski et al. | |
| 6,407,894 B1 | 6/2002 | Bilac | |
| 6,617,833 B1 | 9/2003 | Xi | |
| 6,636,025 B1 | 10/2003 | Irissou | |
| 6,657,906 B2 | 12/2003 | Martin | |
| 6,762,917 B1 | 7/2004 | Verbiest et al. | |
| 6,807,040 B2 | 10/2004 | Ivanov et al. | |

(Continued)

OTHER PUBLICATIONS

Gu, Wei; Improve that Mobile Phone Camera; Replace the Anemic LED Flash with a Xenon Flashlamp and a Tiny Photoflash Capacitor Charger; Linear Technology Magazine; Dec. 2006; pp. 14-19; vol. XVI, No. 4.

(Continued)

*Primary Examiner* — Pharti H Patel
(74) *Attorney, Agent, or Firm* — Sheppard, Mullin, Richter & Hampton, LLP

(57) ABSTRACT

Devices, such as mobile devices, may be exposed to short circuit and output overload events. To protect against such events, mobile devices typically include current limit circuits. Some current limit circuits may involve user programmable function. User programmable function may need accurate current limit detectors. Various embodiments of the present invention include devices and methods for detecting one or more programmed current limits. Some embodiments allow for a user application to select among parallel or serial configurations of current detection circuitry. Each such configuration may include multiple resistive devices of different resistive values.

39 Claims, 13 Drawing Sheets

U.S. PATENT DOCUMENTS

| | | | |
|---|---|---|---|
| 6,859,000 | B2 | 2/2005 | Kessler |
| 6,947,272 | B2 | 9/2005 | Daniels et al. |
| 7,181,954 | B2 | 2/2007 | Horie |
| 7,248,026 | B2 | 7/2007 | Ritter |
| 7,253,997 | B2 | 8/2007 | Balakrishnan et al. |
| 7,268,992 | B2 | 9/2007 | Hallak |
| 7,342,761 | B2 | 3/2008 | Covault |
| 7,459,891 | B2 | 12/2008 | Al-Shyoukh et al. |
| 7,573,689 | B2 | 8/2009 | Hojo |
| 2002/0181181 | A1* | 12/2002 | Smith .............. 361/104 |
| 2004/0075600 | A1 | 4/2004 | Vera et al. |
| 2005/0059359 | A1 | 3/2005 | Dornbusch |
| 2005/0243894 | A1 | 11/2005 | Chen et al. |
| 2007/0008795 | A1 | 1/2007 | Tsukada |

OTHER PUBLICATIONS

AAT4620 PCMCIA Current Limit Interface; Analogic Tech; Apr. 2006; pp. 1-7.

Start-Up Current-Limiters for Supercapacitors in PDAs and Other Portable Devices; cap-XX Application Note No. 1002; Feb. 2002; pp. 1-14; Revision 2.1; cap-XX Pty. Ltd.; Lane Cove, NSW, Australia.

PCT International Search Report and Written Opinion dated Mar. 28, 2008 for International Application No. PCT/US07/81276.

PCT International Search Report and Written Opinion dated May 5, 2008 for International Application No. PCT/US07/81300.

PCT International Search Report and Written Opinion dated May 7, 2008 for International Application No. PCT/US07/81292.

PCT International Search Report and Written Opinion dated May 7, 2008 for International Application No. PCT/US07/81563.

AND8140/D:SMART HotPlug Current Limit Function; ON Semiconductor; Nov. 2004-Rev.1.

Notice of Allowance mailed Oct. 6, 2009 from U.S. Appl. No. 11/752,049, filed May 22, 2007.

Office Action mailed Sep. 22, 2010 from U.S. Appl. No. 12/401,532, filed Mar. 10, 2009.

* cited by examiner

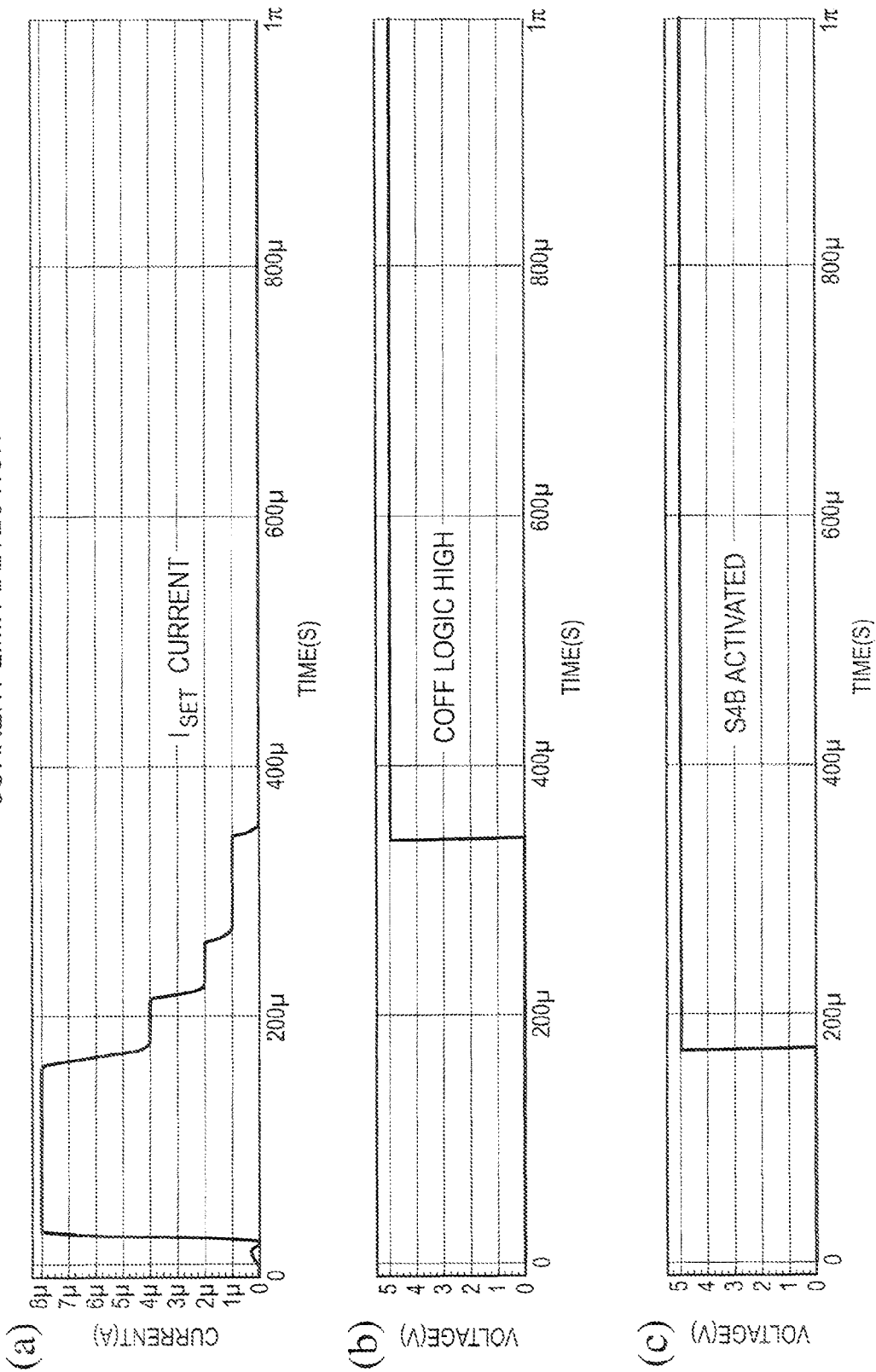
FIG. 8 PART 1

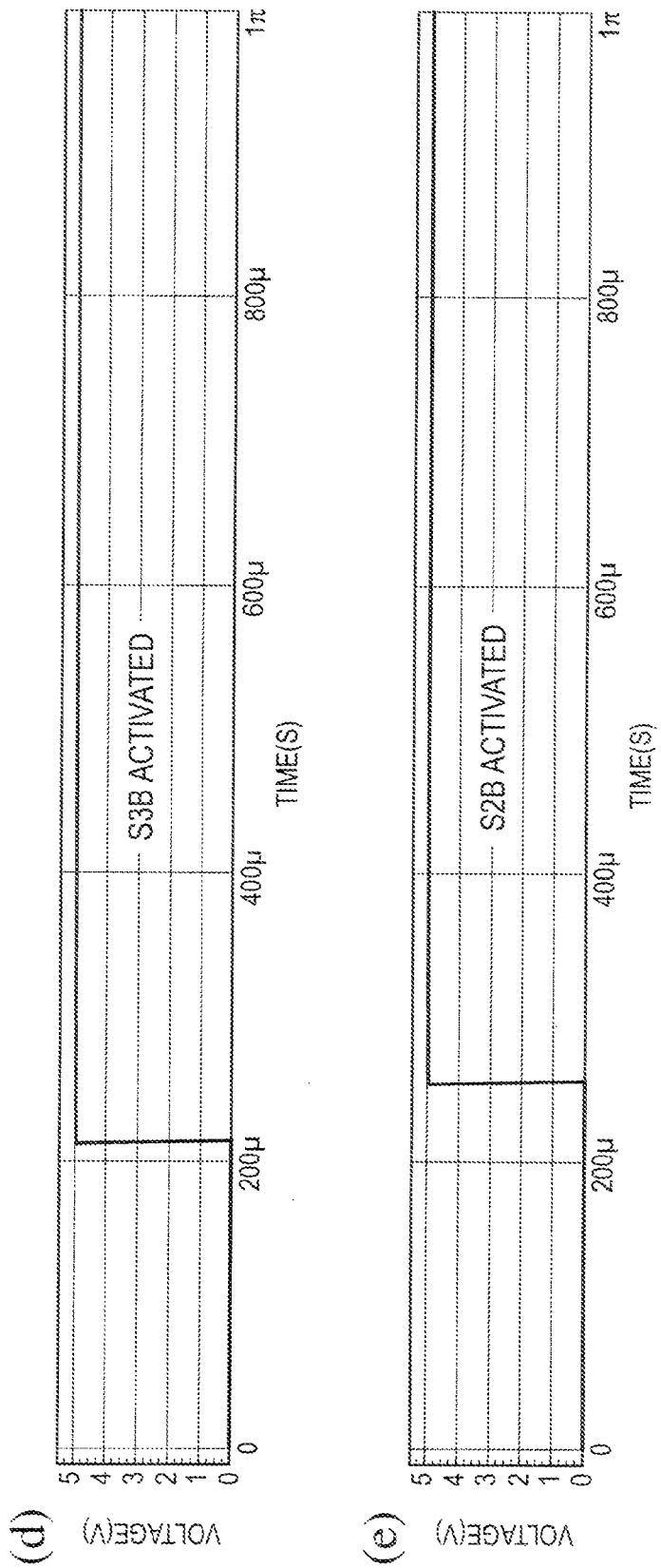
FIG. 8 PART 2

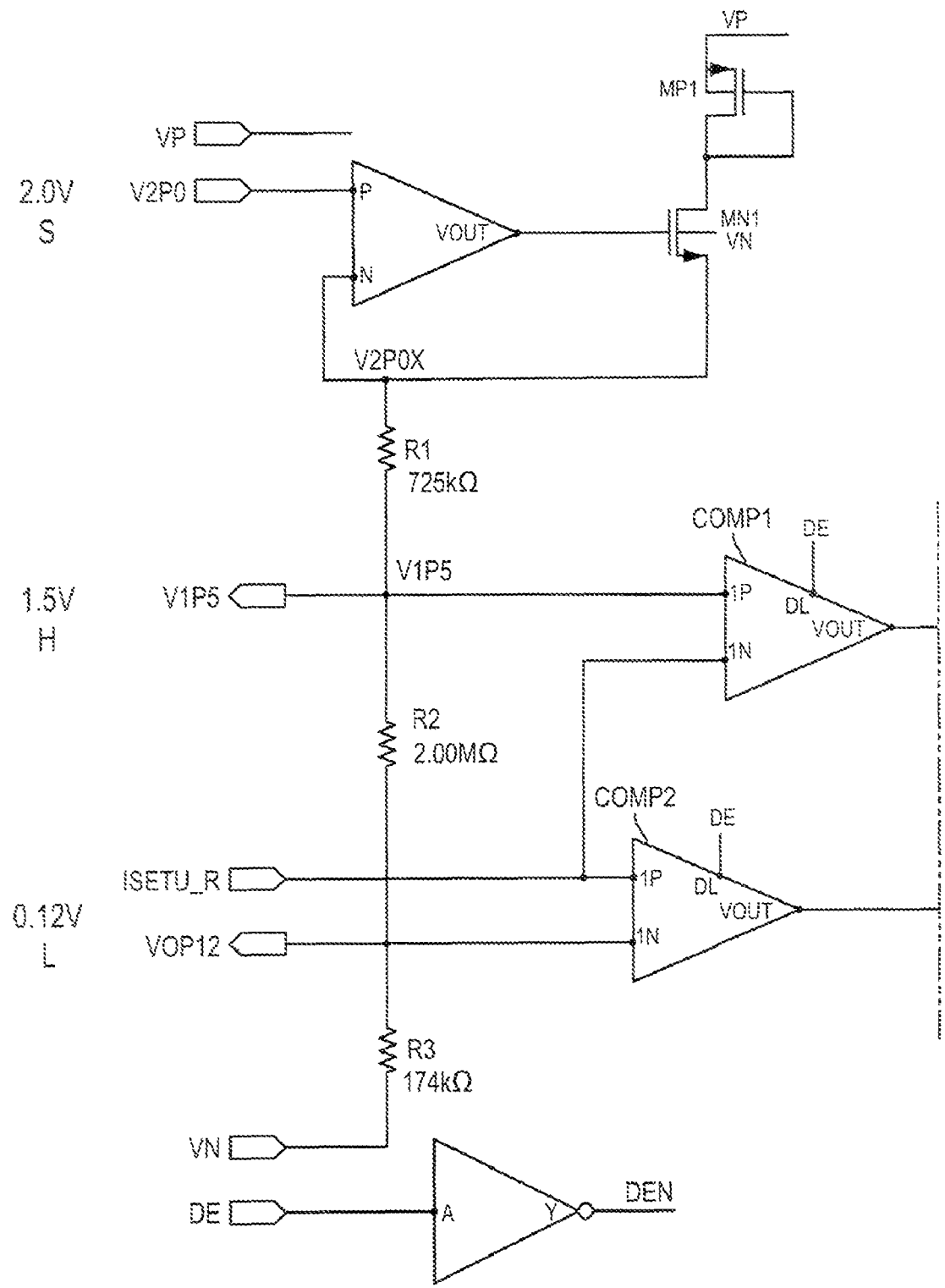
FIG. 9 PART 1

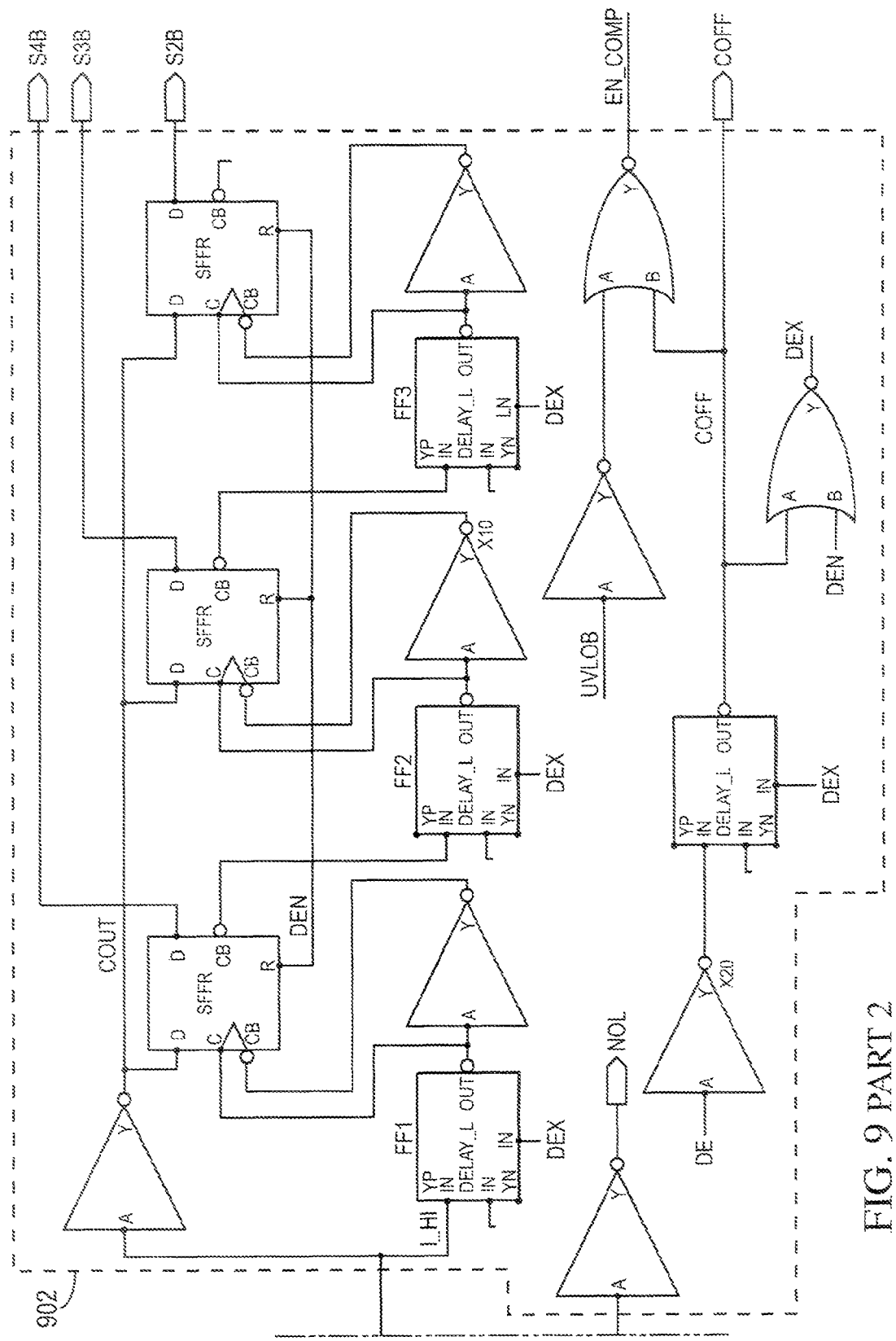
FIG. 9 PART 2

SYSTEM AND METHOD FOR DETECTION OF MULTIPLE CURRENT LIMITS

REFERENCE TO EARLIER APPLICATION

This application claims the benefit of and incorporates by reference U.S. Provisional Applications, Ser. No. 60/829,307, filed Oct. 13, 2006, titled "Current Limit Detector" and Ser. No. 60/912,921, filed Apr. 19, 2007, titled "System and Method for Detection of Multiple Current Limits."

FIELD OF THE INVENTION

The present invention relates generally to power management in mobile devices and more specifically to current limit detectors with an application in devices such as load switches.

BACKGROUND

Current limiting is the practice of imposing an upper limit on the current that may be delivered to a load. The typical purpose of current limiting is to protect the circuit up or downstream from harmful effects due to, for example, a short circuit. In load switch applications used in power sources and adapters, current may be limited below a load switch setting. Load switch applications include driving a power line of a universal serial bus (USB) connector to various peripheral devices. Examples of load switch devices include current limited load switch devices produced by Advanced Analogic Technologies, Inc. (Sunnyvale, Calif.) as integrated circuits (ICs) designed to protect external power ports and to extend battery life in portable electronic products. Such load switch devices operate with an integrated current limiting circuit that protects, for example, the input supply against large changes in load current which could otherwise cause the supply to fall out of regulation.

As current limited devices, load switches are able to draw current up to the load switch setting. If the current exceeds the load switch setting, the current limiting circuit in the load switch limits the current flowing through the load switch. Typically, a resistor (either external or internal to the IC) is used to set the load switch current limits. Typically, within an operating voltage range of the load switch, a single current limit is set based on the resistive value chosen by the designer. One disadvantage of using a single resistor for a wide operating voltage range (and thus a wide range of load current) is loss of accuracy. This loss may occur, because the resistive value and tolerance typically determine the level of granularity of current increments detectable. For example, as shown in FIG. 1, in system design, a user selects a resistor having a resistive value, $R_{SET}$. The user also defines a current limit to be associated with the resistive value, thereby establishing a one-to-one correspondence between the two parameters. The current limit is arbitrarily selectable by the designer. In this example, the designer has defined the current limit of 100 mA to correspond to a resistive value of 100Ω, and the current limit of 1 A to correspond to 1 kΩ.

A single resistor allows the load switch application to select a single current limit. For example, the same current limit may apply regardless of whether the application is in transmit, receive, or stand-by mode. The current limit detection circuitry may need to be duplicated in order to include in the design capabilities to detect more than one current limit. For example, one current limit may be for stand-by mode and another (e.g., higher) current limit may be for operating mode (e.g., transmit and/or receive mode).

Therefore, there is a need for detectors of multiple current limits. One desired aspect might be to allow for detecting multiple user-defined current limits. Another desired aspect might be to minimize duplication of current limit detection circuitry, if feasible.

SUMMARY

The present invention is based, in part, on the foregoing observations and in accordance with its purpose various embodiments of the invention include devices and methods for detecting current limits. Generally, the various implementations of a device for detecting current limits can use a single resistive device associated with a corresponding single user-defined current limit. Other implementations of devices for detecting multiple current limits can use one or more current limit detectors coupled to multiple resistive devices in a series or parallel configuration to detect one or more current limits. Such current limits may be detected one after another (e.g., in series), substantially at the same time (e.g., in parallel), or any combination thereof. The proposed new implementations may use an integrated circuit (IC) or a number of discrete components that are typically flexible and efficient in detecting current limitation. To illustrate, a number of embodiments are explained in more detail below.

According to one embodiment, a device for detecting one or more current limits comprises a detector, multiple resistive devices coupled to the current limit detector, and a selection switch coupled to the multiple resistive devices. The detector is operative to detect a user-defined current limit. Each resistive device is adapted to conduct a sum of currents which produces a voltage drop across it. Each resistive device is associated with a respective user-defined current limit. The selection switch is operative to select one of the multiple resistive devices in response to a select signal. The detector is adapted to provide any user-defined current limit which the current limit detector is operative to detect. Such providing is performed by step-wise decreasing the sum of currents and is based on the sum of currents conducted through a selected one of the multiple resistive devices.

In such device, each of the multiple resistive devices may include a ground terminal. The selection switch may be coupled to the ground terminal of each of the multiple resistive devices. The selection switch may also be operative to select a different one of the multiple resistive devices in response to a change in the select signal. The current limit detector may include a plurality of current paths, a high reference voltage terminal, and a high-level comparator. The detector may also include a memory operatively coupled to the current limit detector and operative to store the detected user-defined current limit.

According to another embodiment, a device for detecting one or more current limits comprises a detector, multiple resistive devices, and a selection switch. The detector includes multiple current limit detectors. Each current limit detector is operative to detect a respective user-defined current limit. Each of the multiple resistive devices is coupled to a respective one of the multiple current limit detectors. Each of the multiple resistive devices has a resistive value associated with the respective user-defined current limit, and each is adapted to conduct a respective sum of currents which produces a voltage drop across it. The detector is adapted to provide any user-defined current limit which the multiple current limit detectors are operative to detect. Such providing is performed by step-wise decreasing the respective sum of currents and is based on the respective sum of currents being conducted through a resistive device of the selected one of the multiple current limit detectors.

In this embodiment, each current limit detector may be further operative to communicate the detected respective user-defined current limit to a current limit controller in response to the select signal. Each of the multiple resistive devices may include terminals, including a ground terminal. Each of the multiple resistive devices may be coupled to ground at its ground terminal and may be coupled at another of its terminals to its respective one of the multiple current limit detectors. Each of the current limit detectors may include a plurality of current paths, a high reference voltage terminal, and a high-level comparator.

According to another embodiment, a method for detecting one or more current limits comprises selecting a resistive device, and detecting the user-defined current limit associated with the selected resistive device. The detecting is performed at the current limit detector. Selecting the resistive device is based on a select signal received from a selection switch. The selected resistive device is one of multiple resistive devices. Each of the multiple resistive devices has a resistive value associated with a respective user-defined current limit. Each resistive device is adapted to conduct a respective sum of currents. The user-defined current limit is detected based on the sum of currents being conducted through the selected resistive device by step-wise decreasing such sum of currents.

Such method may also include communicating the detected user-defined current limit to a current limit controller. It may also include selecting a different one of the multiple resistive devices in response to a change in the select signal. The method may further include comparing a voltage drop and a high threshold voltage, and establishing a relationship between a sum of currents and the user-defined current limit of the selected resistive device associated with the sum of currents. Moreover, the method may include storing the detected user-defined current limit in a memory operatively coupled to the current limit detector.

According to yet another embodiment, a method for detecting one or more current limits comprises selecting a current limit detector and detecting a respective user-defined current limit. Selecting the current limit detector is based on a select signal received from a selection switch. The selected current limit detector may be any one of multiple current limit detectors in a detector. Each of the multiple current limit detectors includes a resistive device of a predetermined resistive value associated with the respective user-defined current limit. Each of the multiple current limit detectors is adapted to conduct a respective sum of currents. The detecting is performed at the selected current limit detector. The respective user-defined current limit is detected based on the sum of currents being conducted through the respective resistive device by step-wise decreasing such sum of currents.

Such method may also include communicating the detected user-defined current limit to a current limit controller. It may also include selecting a different one of the multiple current limit detectors in response to a change in the select signal. The method may further include comparing a voltage drop and a high threshold voltage, establishing a relationship between the sum of currents and the user-defined current limit of the selected current limit detector, and detecting the user-defined current limit of the selected current limit detector associated with its sum of currents. The comparing may be performed at the selected current limit detector. The establishing may be performed by operating, at the selected current limit detector, one or more of the current switches step-wise in response to the comparing.

According to yet another embodiment, an apparatus for detecting one or more current limits comprises a detector, multiple resistive devices, a selection switch, and a current limit controller. The detector is operative to detect a user-defined current limit. Each of the multiple resistive devices has a resistive value associated with a respective user-defined current limit. Each of the multiple resistive devices is adapted to conduct a sum of currents which produces a voltage drop across it. The selection switch is operative to select one of the multiple resistive devices in response to a select signal. The current limit controller is operatively coupled to the detector and is operative to limit an output current so as not to exceed the detected user-defined current limit. The detector is adapted to detect a user-defined current limit, based on the sum of currents being conducted through the selected one of the multiple resistive devices, by step-wise decreasing such sum of currents.

Such apparatus may also include a memory operatively coupled to the detector. The memory may be operative to store the detected user-defined current limit. The apparatus may further include a charge storage device adapted to cooperate with the current limit controller and to provide an energy reservoir capable of supplying burst power.

In such apparatus, the detector may include a plurality of current paths, a high reference voltage terminal, and a high-level comparator. In such apparatus, the detector may also include multiple current limit detectors. Limiting the output current may include outputting, at the current limit controller, a sequence of control signals. Each control signal may be associated with one step in the limitation of the output current. The apparatus may further include a current limit portion operatively coupled to the current limit detector and to the current limit controller. The current limit portion may be operative to regulate the output current in response to the sequence of control signals received from the current limit controller.

In these embodiments, various possible attributes may be present. The device may be embodied in an integrated circuit (IC) or as a functional block in the IC. The IC may be adapted for use in a mobile device. The detector may be operative to communicate the detected user-defined current limit to the current limit controller. Each of the plurality of current paths may be adapted to conduct current. At least one of the current paths may include a current switch operable to interrupt current conduction therethrough. Collectively, currents flowing through the plurality of current paths may combine to produce the sum of currents. The high reference voltage terminal may be operative to supply a high threshold voltage. The high-level comparator may include inputs and an output. One of the inputs may be operative to receive the high threshold voltage and another one of the inputs may be operatively coupled to the selected one of the multiple resistive devices. The high-level comparator may produce at the output a signal responsive to a comparison between the voltage drop and the high threshold voltage. The output may be adapted to operate the current switch to step-wise detect the user-defined current limit associated with the sum of currents by step-wise decreasing such sum of currents. The terminal of each of the multiple resistive devices coupled to the current limit detector may be coupled to the plurality of current paths. Each current path may be further adapted to conduct current of an amount specific to it. The amount of the current being conducted on each current path may be based on a scale of its respective current switch.

The comparison between the voltage drop and the high threshold voltage may include determining whether the voltage drop exceeds the high threshold voltage. The resistive value may be predetermined based on the user-defined current limit. The voltage drop may be a product of a plurality of currents flowing through a plurality of current paths and combining into the sum of currents flowing through the selected resistive device. The resistive value of the selected resistive devices may be set to establish the relationship between the sum of currents and the user-defined current limit associated with the selected resistive device. Each current path may be adapted to conduct current, and at least one of the current paths may include a current switch operable to interrupt current conduction therethrough. Each of the multiple resistive devices may include a resistor.

These and other embodiments, features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification, illustrate various aspects of the invention and, together with the description, serve to explain its principles. Wherever convenient, the same reference numbers will be used throughout the drawings to refer to the same or like elements.

FIG. 8 is an exemplary graph of current, $I_{SET}$, over time with $R_{SET}$ of 1 MΩ as current switches included in the current limit detector of FIG. 7 are successively activated, according to one embodiment of the present invention.

FIG. 9 illustrates circuit details of a current limit detector, according to one embodiment of the present invention.

DETAILED DESCRIPTION

Devices, such as mobile devices, may be exposed to short circuit and output overload events. These devices may be capable of operating in multiple modes and each mode may benefit from a different user-defined current limit. It may therefore be advantageous to protect these devices with circuitry capable of detecting multiple current limits and to limit their supply current in response to such detection.

Accordingly, various embodiments of the invention include devices and methods for detecting multiple current limits. Such devices and methods preferably include multiple resistive devices, multiple current limit detectors, or a combination of both, for detecting multiple current limits.

Figure 2A:
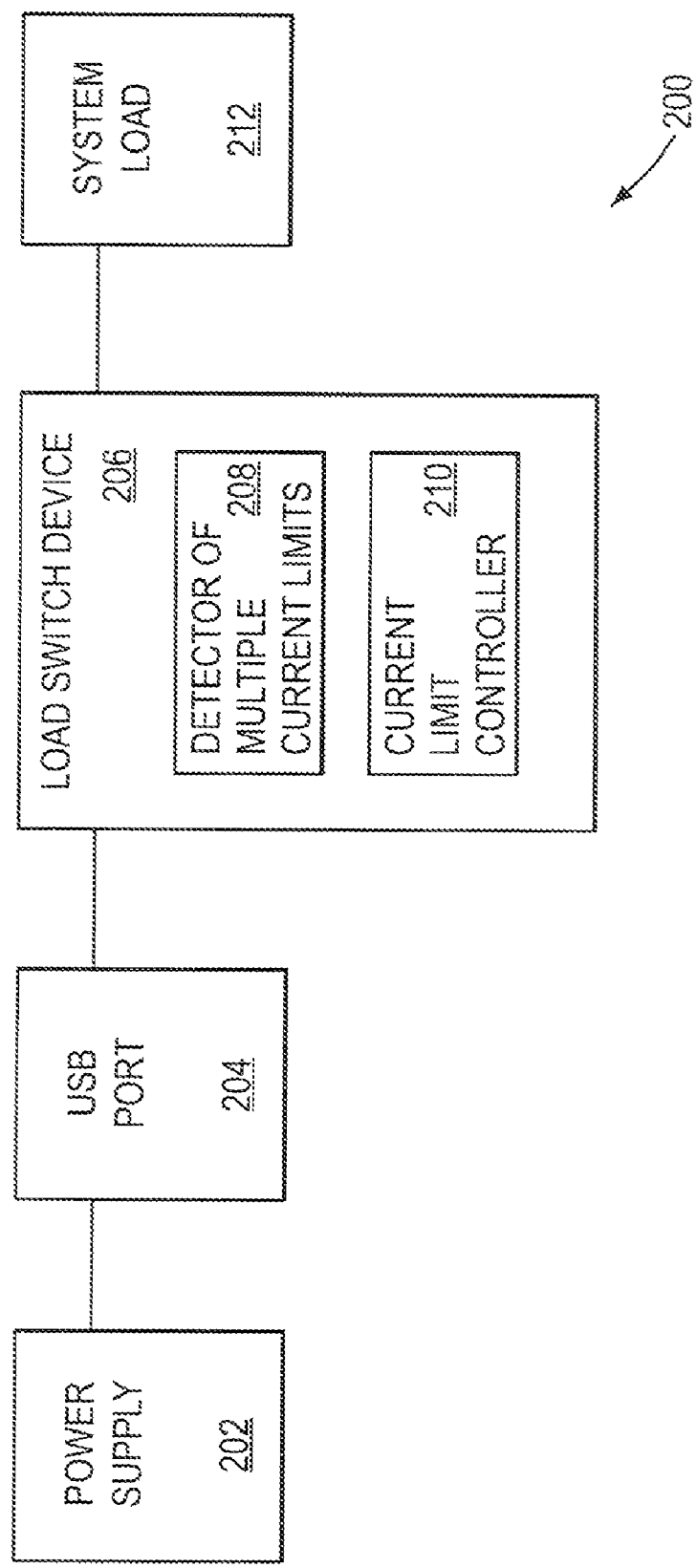
FIG. 2A is a block diagram of a load switch application, according to one embodiment of the present invention.

FIG. 2A is a block diagram showing the implementation of an application 200 with a load switch device 206, according to one embodiment of the invention. As shown, the application 200 includes a power supply 202 operatively coupled, via a universal serial bus (USB) port 204, to the load switch device 206. The load switch device 206 is in turn operatively coupled to a system load 212.

The power supply 202 is a device or system adapted to supply electrical energy to the USB port 204. Examples of power supplies 202 include batteries, direct current (DC) power supplies, chemical fuel cells, solar power, and other types of energy storage systems.

The load switch device 206 includes a detector 208 and a current limit controller 210. In various embodiments, the detector 208 may be a detector of multiple current limits. The detector of multiple current limits 208 is operative to detect a current limit using a resistive device and to provide (e.g., determine, communicate) the detected current limit to the current limit controller 210. The resistive device may be a resistor or any device capable of providing an electrical resistance (i.e., capable of opposing electrical current). The detector of multiple current limits 208 may include one or more current limit detectors, which in turn may include one or more comparators, resistors, and current switches (such as transistors) operatively connected and functioning to detect limits on the current. The detector of multiple current limits 208 is described in detail with reference to FIGS. 3-5.

The current limit controller 210 is operative to receive the detected current limit from the detector of multiple current limits 208 and to limit the current flowing through the load switch device 206. The current limit controller 210 may include a current limit converter, an operational amplifier, a resistor (such as a current sensing resistor), and transistors operatively connected thereto.

The system load 212 may be any device connected to the output of the load switch device 206. Examples of system loads 212 include a PCMCIA card, a compact flash card, and a camera flash LED.

Figure 2B:
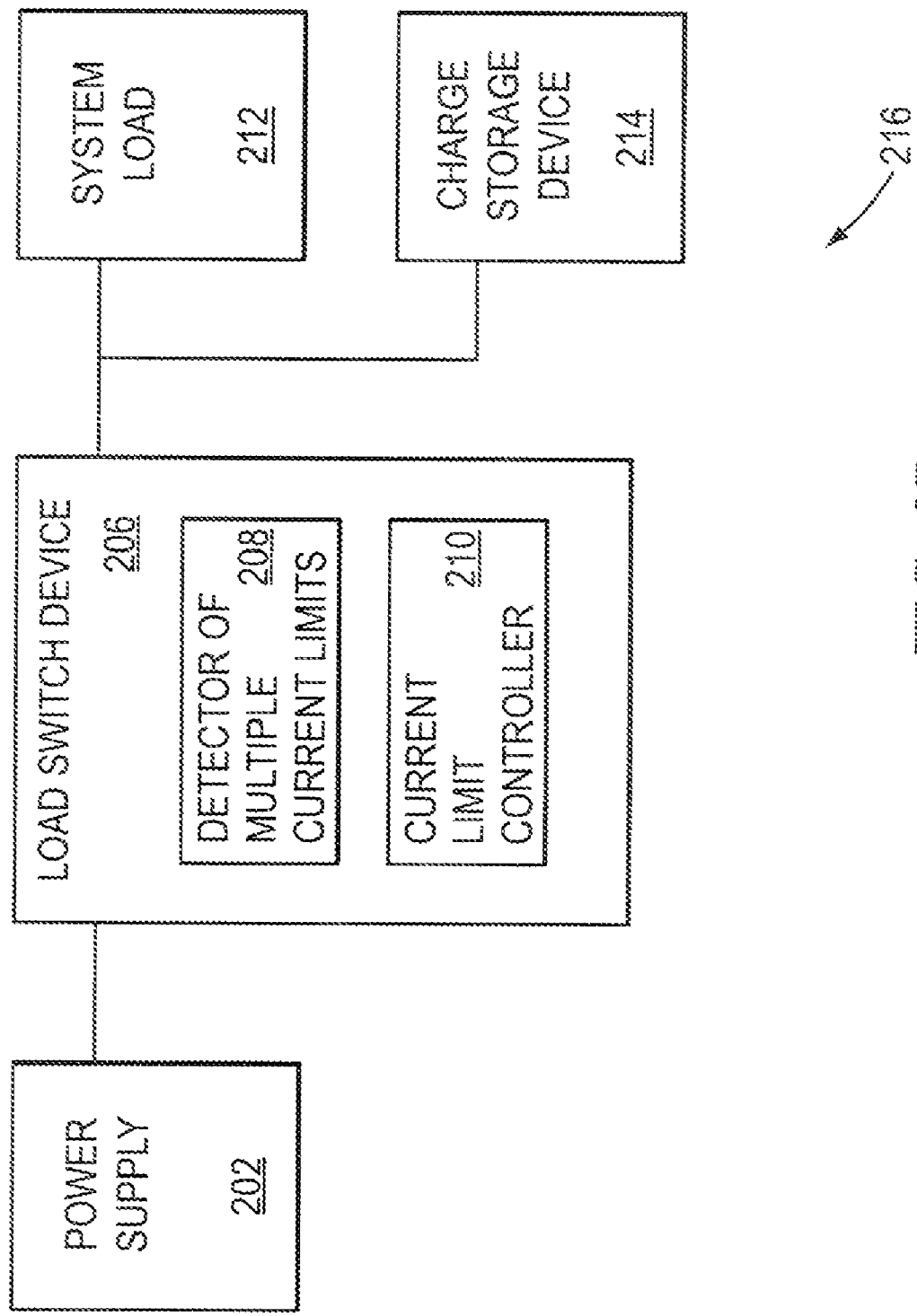
FIG. 2B is a block diagram of another load switch application, according to one embodiment of the present invention.

FIG. 2B is a block diagram of another load switch application 216, according to one embodiment of the present invention. Application 216 includes the power supply 202, the load switch device 206, the system load 212, and a charge storage device 214. The power supply 202 is operatively coupled to the load switch device 206, which is operatively coupled to both the system load 212 and to the charge storage device 214. As in application 200, the load switch device 206 may include the detector of multiple current limits 208 and the current limit controller 210.

The charge storage device 214 operates as an energy reservoir adapted to supply burst power. Examples of charge storage devices 214 include boost converters and energy storage devices such as supercapacitors. Generally, a boost converter is a voltage step-up converter that is often regarded as a switching mode power supply. Energy storage devices, unlike boost converters, are based on charge storage and may be used as a power source. A supercapacitor is a type of high-energy storage device designed to be charged and recharged repeatedly and to provide instantaneous high discharge currents with rapid recharge between discharge operations. The charge storage device 214 may also include a combination of boost converter, supercapacitor, and any other type of energy storage device. In some embodiments, the charge storage device 214 may be disposed external to the load switch device 206. For example, it may be detachably coupled to the load switch device 206. In such embodiments, the charge storage device 214 is adapted to cooperate with and to supply burst power to the load switch device 206.

Figure 3:
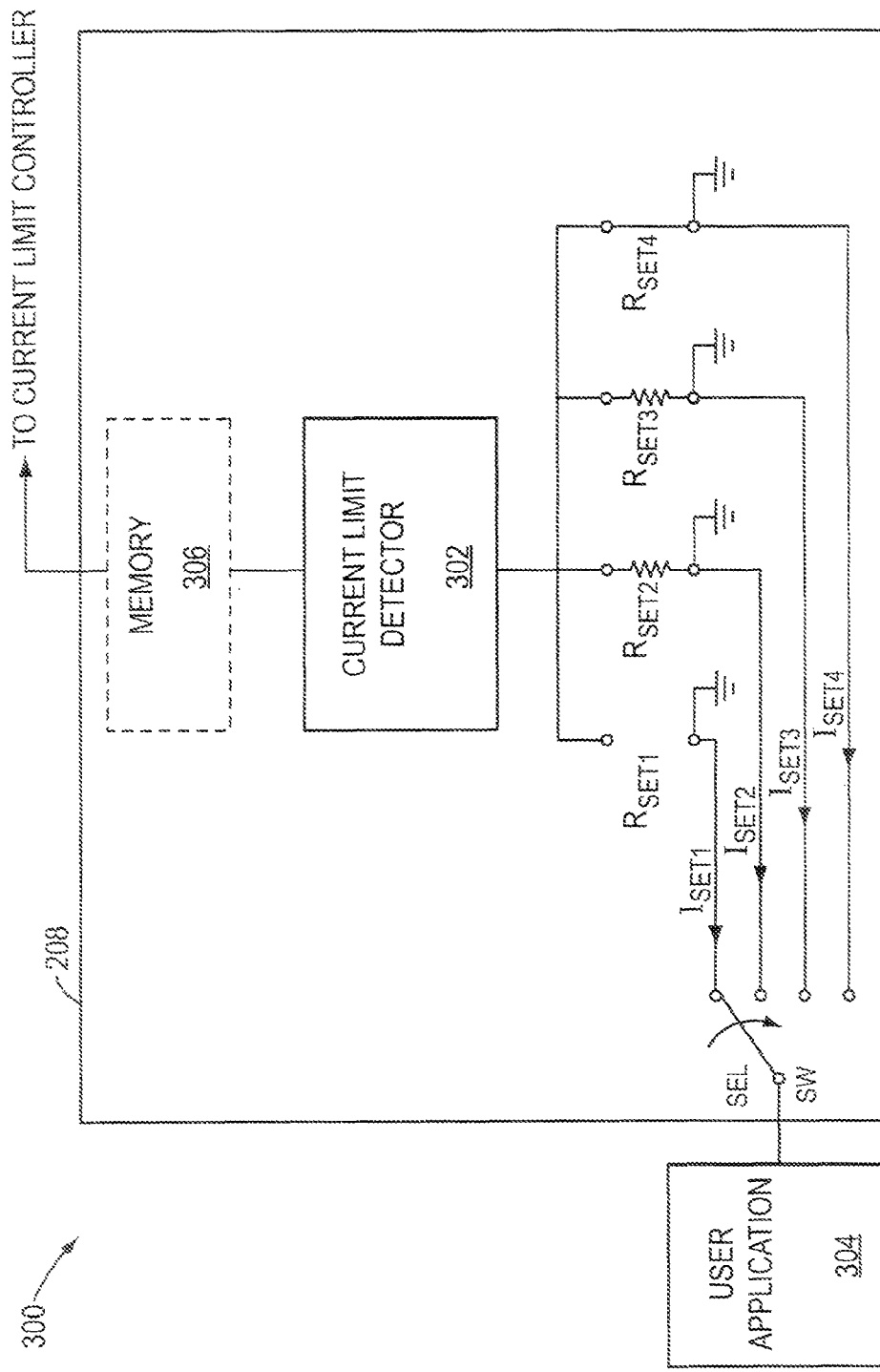
FIG. 3 is a block diagram of a load switch application for serial detection of multiple current limits, according to one embodiment of the present invention.

Each current limit detector may be implemented with multiple resistive devices. One implementation is shown in FIG. 3, which illustrates a block diagram of a load switch application 300 for serial detection of multiple current limits, according to one embodiment of the present invention. The load switch application 300 includes the detector 208 operatively coupled to a user application 304. In this embodiment, the detector may include a detector of multiple current limits 208 that includes a current limit detector 302, resistive devices $R_{SET1}$-$R_{SET4}$, a selection switch, SW, and an optional memory 306.

The user application 304 is operative to generate and output a selection, SEL, signal. The selection switch, SW, is operative to receive the SEL signal and to select one of the resistive devices $R_{SET1}$-$R_{SET4}$ in response thereto. The current limit detector 302 is operatively coupled to each of the resistive devices and is operative to receive the current flowing through the selected resistive device, i.e., one of $I_{SET1}$-$I_{SET4}$. The current limit detector 302 may comprise any type of current limit detector. The current limit detector 302 is operative to detect the current limit and to output the detected current limit to a current limit controller (e.g., the current limit controller 210 of FIGS. 2A, 2B).

Optionally, the detected current limit may be stored in memory 306 prior to being communicated (e.g., output) to the current limit controller. Upon installation, start-up, or re-boot of the user application 304, the current limit associated with each resistive device may be detected and saved to memory 306 before the user application 304 continues its operation. In such embodiments, when the user application 304 selects a different resistive device during operation, the current limit for the newly selected resistive device need not be detected anew. Rather, the current limit associated with the newly selected resistive device is retrieved from the memory 306. Doing so saves the time otherwise necessary for the current limit detector 302 to detect the current limit. Such time saving may be advantageous in user applications 304 that frequently switch current limits and thus resistive devices. In one exemplary cell phone embodiment, a lower current limit may be associated with a stand-by mode, an intermediate current level with a receive mode, and a highest current limit with a transmit mode. The time saving may also be advantageous in user applications 304 that involve user interaction as users may otherwise notice the delay, for example, as users wait for a display to respond to user input.

However, some user applications 304 may require a minimum start-up time and may be implemented without the memory 306. In such user applications 304, only the current limit associated with the resistive device selected upon start-up is detected. The current limits associated with the other resistive devices are not detected until and unless the user application 304 outputs the SEL signal to select a particular, different, resistive device. At such time, in some embodiments, only the current limit associated with the newly selected resistive device is detected. If the user application 304 later switches back to a previously used resistive device, the associated current limit needs to be detected anew as no memory 306 is included from which to retrieve a previously stored detected current limit. Thus, whether to include the memory 306 and, if included, whether to detect more than one current limit upon start-up may be user-defined and the advantages and disadvantages of any approach may depend on the type of user application 304 involved. Possible approaches include detecting one, multiple, or all current limits in an initial current detection sequence and/or saving one or more of the detected current limits to memory 306, if included in the load switch device.

The user application 304 may be any user application that may benefit from current limit detection and current limit control. Examples of user applications 304 include camera flash LED, PCMCIA card, and compact flash card applications. The SEL signal may be based on a state (e.g., mode) of the user application 304. For example, in a camera flash LED application, it may be advantageous to use different current limits for stand-by and ready modes. The user application 304 may then change the current limit by changing the SEL signal output to the selection switch, SW.

In the illustrated embodiment, the user application 304 can select an open circuit by selecting $R_{SET1}$ and a short circuit by selecting $R_{SET4}$. Resistive devices $R_{SET2}$ and $R_{SET3}$ have different, non-zero resistive values. Other embodiments are possible. For example, some embodiments may include no open circuit and/or no short circuit. Other embodiments may include more or fewer resistive devices than illustrated in FIG. 3.

In operation, the current limit detector 302 performs current limit detection only once, regardless of how many resistive devices are coupled to the current limit detector 302, because only one resistive device may be selected at any one time. FIG. 3 thus illustrates a serial configuration of a current limit detector with a resistive device.

Figure 4:
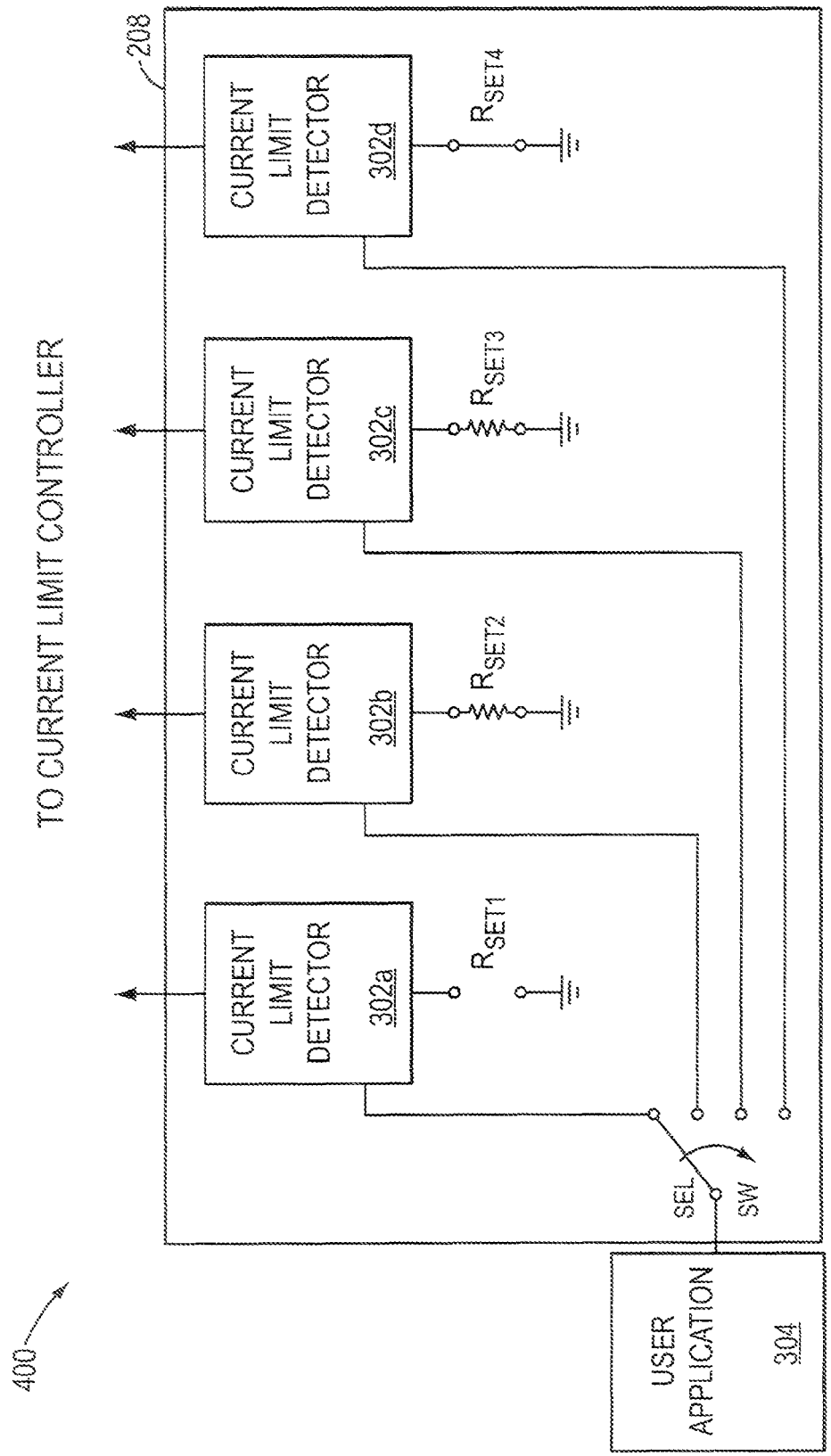
FIG. 4 is a block diagram of a load switch application for parallel detection of multiple current limits, according to one embodiment of the present invention.
Figure 7:
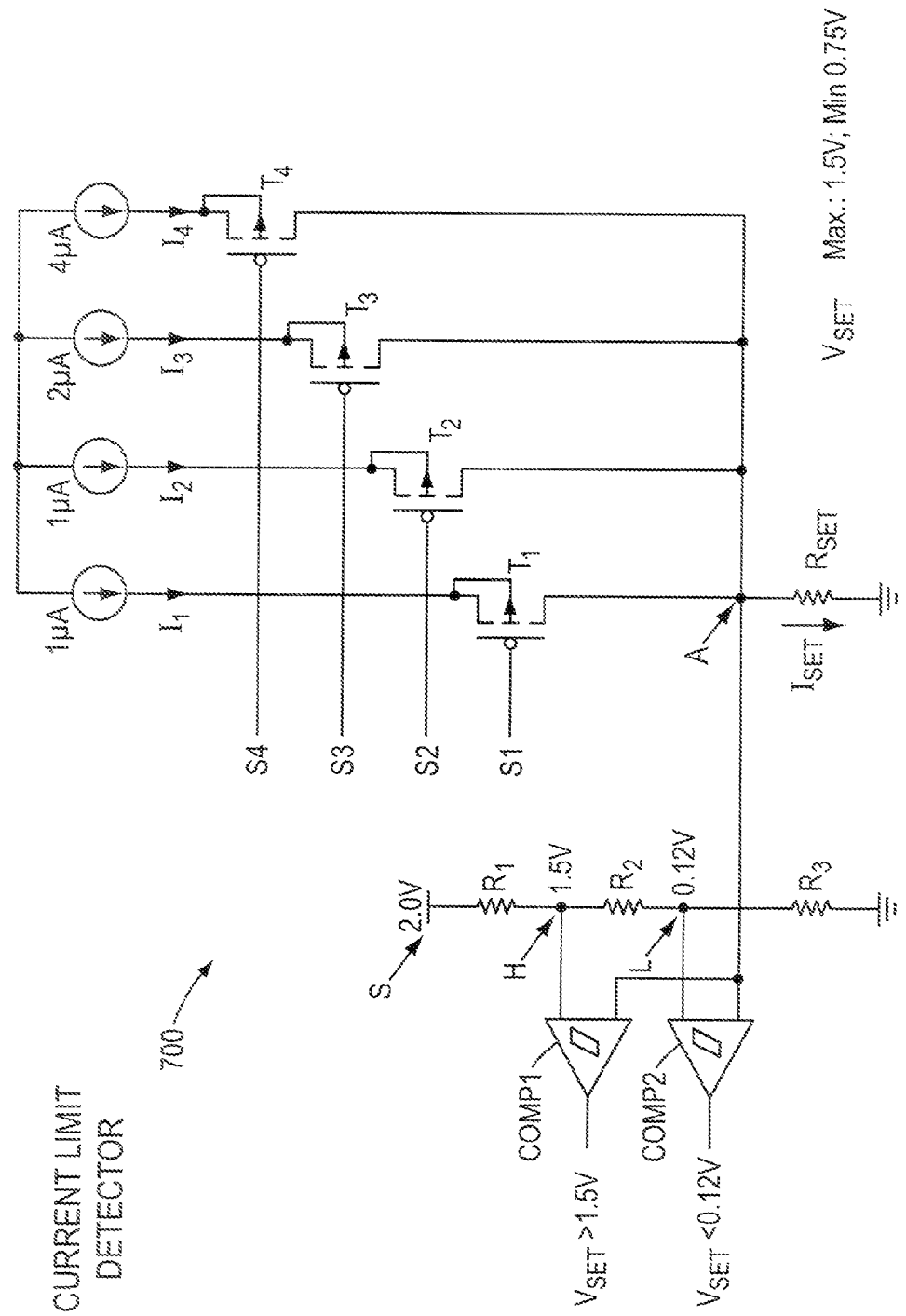
FIG. 7 is a schematic of a current limit detector, according to one embodiment of the present invention.

The resistive devices may alternatively be coupled such that multiple current limits may be detected at substantially the same time. Such a parallel configuration is illustrated in FIG. 4, which is a block diagram of a load switch application 400, according to one embodiment of the present invention. The load switch application 400 includes the user application 304 operatively coupled to the detector of multiple current limits 208. In this embodiment, the detector of multiple current limits 208 includes the selection switch, SW, and the resistive devices $R_{SET1}$-$R_{SET4}$. It also includes one current limit detector 302a-d for each resistive device $R_{SET1}$-$R_{SET4}$. The current limit detectors 302a-d may be any type of current limit detector. In one embodiment, each current limit detector 302a-d includes its own set of current paths with current switches (e.g., transistors) that turn ON and OFF corresponding current path (e.g., as illustrated in FIG. 7). As described with reference to FIG. 3, the resistive devices may include an open circuit, a short circuit, one or more resistive devices with non-zero resistive values, or any combination thereof.

In operation, the user application 304 outputs the SEL signal to select one of the current limit detectors 302a-d. Upon selection of, for example, current limit detector 302b, this current limit detector outputs the current limit it detects to the current limit controller. In the parallel configuration illustrated in FIG. 4, each current limit detector 302a-d may detect its associated current limit upon start-up independently of the current limit detection performed by the other current limit detectors 302a-d. Therefore, if the user application 304 selects a different current limit detector during operation, for example, current limit detector 302c, this current limit detector may have already detected the associated current limit and is adapted to substantially instantly output this detected current limit to the current limit controller. Thus, as mentioned, one advantage of the parallel configuration is a saving of the time it otherwise takes one of the current limit detectors 302a-d to detect its current limit. One advantage of the serial configuration of FIG. 3, however, is that the resistive devices $R_{SET1}$-$R_{SET4}$ may share the same current limit detector circuitry. With the parallel configuration of FIG. 4, such current limit detector circuitry typically needs to be duplicated.

Figure 5:
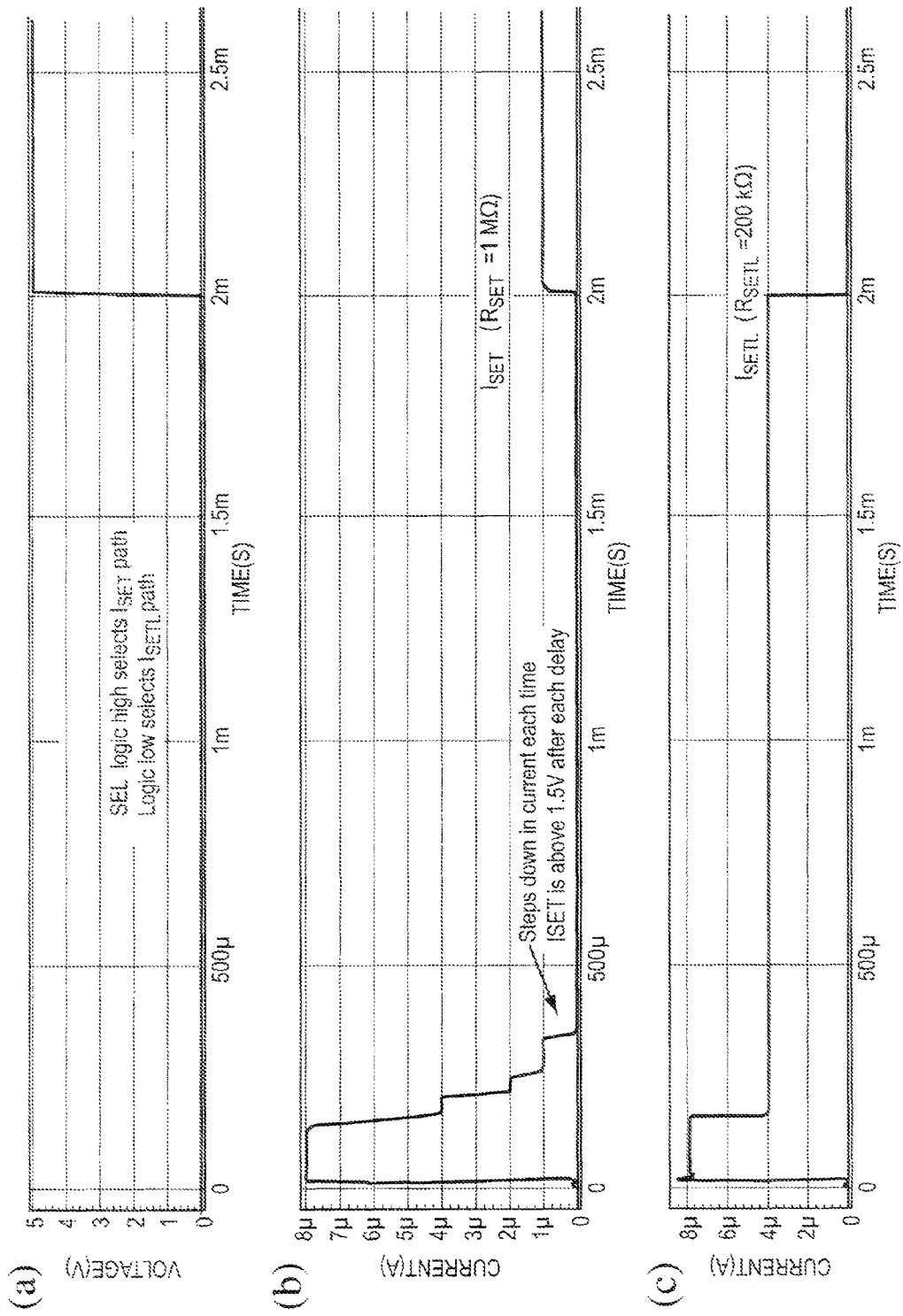
FIG. 5 is an exemplary graph of current output from a selected one of two parallel resistive devices in response to a select signal being activated, according to one embodiment of the present invention.

FIG. 5 is an exemplary graph of current output from a selected one of two parallel resistive devices in response to the SEL signal being activated. In the illustrated example, one resistive device, $R_{SET}$, has a resistive value of 1 MΩ and is operative to conduct current $I_{SET}$. The other resistive device, $R_{SETL}$, has a lower resistive value of 200 kΩ and is operative to conduct current $I_{SETL}$. The selection switch may select between the two resistive devices and thus between the two different currents in response to the SEL signal.

For a comparison between FIGS. 4 and 5, $R_{SET}$ may correspond to $R_{SET2}$ and $R_{SETL}$ may correspond to $R_{SET3}$ of FIG. 4. Each parallel resistive device $R_{SET}$, $R_{SETL}$ is associated with its own current limit detector (e.g., current limit detectors 302b-c of FIG. 4). Upon start-up, each of the two current limit detectors performs current limit detection. Graph (b) of FIG. 5 illustrates a current limit detection sequence of current detector 302b, corresponding to $R_{SET}$. The current limit detection sequence includes four step-wise decreases of the current, $I_{SET}$, before the current limit is detected. In parallel, i.e., substantially at the same time, current limit detector 302c performs the sequence for $R_{SETL}$ by step-wise reducing the current, $I_{SETL}$, flowing through the current limit detector 302c until its current limit is detected. This is illustrated in graph (c). Initially, per graph (a), the user application 304 outputs a low SEL signal, which is operative to select the $I_{SETL}$ current. This causes the current limit detected by and associated with the current limit detector 302b to be communicated to the current limit controller. At approximately 2 milliseconds, the user application 304 changes the SEL signal to high, thereby causing the $I_{SET}$ path to be selected and the current limit associated with current limit detector 302c to be communicated to the current limit controller. The current limit detection sequence is described with reference to FIGS. 7 and 8.

Figure 1:
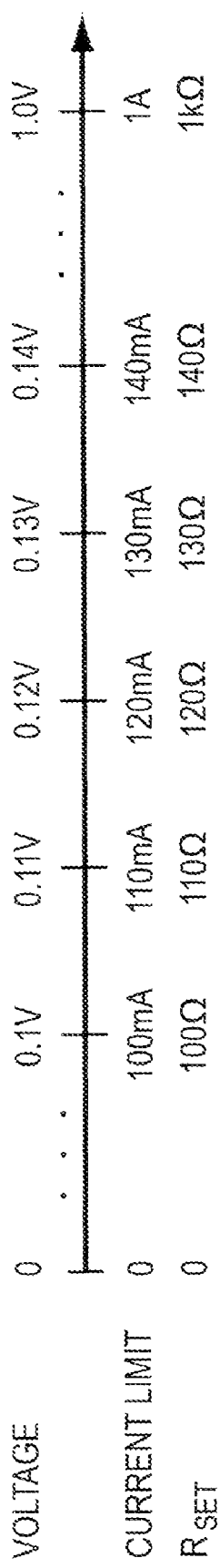
FIG. 1 is a diagram illustrating the one-to-one association of resistive value to user-defined current limitation in a conventional current limit detector.
Figure 6:
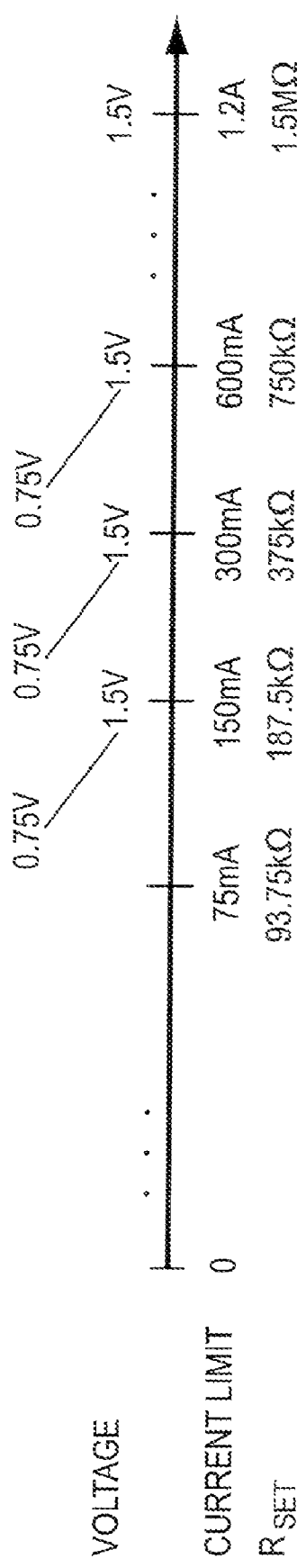
FIG. 6 is a diagram illustrating granularity of current detection achievable through segmentation, according to one embodiment of the present invention.

As noted, the current limit detectors 302 may be any type of current limit detectors. Referring again to FIG. 1, in a conventional current limit detector, the operating voltage range may be 0.1 V to 1.0 V and a one-to-one relationship exists between a resistive value and its corresponding user-defined current limit. One approach to improving accuracy of a current limit detector (e.g., current limit detector 302) in a particular operating voltage range using a single resistive device is to magnify the entire operating voltage range. In one embodiment of such a current limit detector, as shown in FIG. 6, the operating voltage range is 0.75 V to 1.5 V. The range is divided into multiple segments. In each segment, a user-defined resistive value, $R_{SET}$, is associated with a user-defined current limit. Although there are multiple segments, each with the same operating voltage range, a one-to-one relationship is maintained between the chosen resistive value and the defined current limit.

In a first segment, the system designer has selected a resistive value of 93.75 kΩ to be associated with a current limit of between 75 mA and 150 mA. In a second segment, a resistive value of 187.5 kΩ has been selected to be associated with a current limit of between 150 mA and 300 mA. The resistive values and associated current limits are user-defined and may be chosen according to any scheme so long as there is no overlap between segments, i.e., so long as the one-to-one relationship is maintained between $R_{SET}$ and the current limit. This enables proper transition between segments. In FIG. 6, for each segment, the resistive value as well as the current limit is doubled. In other embodiments, as between segments, the resistive value, the current limit or both may be logarithmically or exponentially related. For example, the first and second segments may include $R_{SET}$ of ln(93750) and ln(187500)Ω, respectively. The associated current limits may be selected according to a logarithmic pattern, any other patterns, or even randomly. By magnifying the operating voltage range, and hence also the operating current range, the accuracy may be increased.

In operation, typically upon power-up, a load switch device that includes a current limit detector scheme according to FIG. 6 will detect the current limit. Assume, for example, that the resistive value is 1.5 MΩ. At start-up, the current, $I_{SET}$, flowing through the current limit detector may be such that the voltage, $V_{SET}=R_{SET}\times I_{SET}$, is greater than the upper operating voltage, i.e., greater than 1.5 V. If so, the current limit detector may respond by reducing the current, $I_{SET}$. Such reduced current flowing through the current limit detector may nonetheless produce a voltage, $V_{SET}$, across the resistive device that is greater than 1.5 V. If so, the current, $I_{SET}$, may be reduced further. Once the voltage produced is below 1.5 V, the current is not reduced further, because the current limit detector is then operating within the operating voltage range. At such time, the current, $I_{SET}$, indicates what the corresponding current limit is, i.e., based on the relationship between $I_{SET}$ and the current limit, determination of $I_{SET}$ also establishes the current limit. The current limit may, for example, have been stored into memory within the load switch device. The current limit thus detected may then be communicated to a current limit controller coupled to the current limit detector. The current limit controller may thereafter limit the current to below the current limit and maintain it at or below that level.

The current limit is typically detected once after installation or set-up of the system or device in which the load switch device is incorporated or to which it is otherwise operationally coupled. Thereafter, the current limit is typically not detected anew until power is recycled, for example, when the load switch application is re-started, such as upon power-up, wake-up, and the like. Thereafter, the current limit detector is typically dormant, i.e., not performing its current detection functionality.

Table 1 illustrates the relationship between a resistive value of a resistive device, $R_{SET}$, and a corresponding user-defined current limit. The numbers in Table 1 match those illustrated in FIG. 6. By increasing the resistive value by four orders of magnitude ($2^4$=16), from 93.75 kΩ to 1.5 MΩ, the current limit is likewise increased by a magnitude of four, from 75 mA to 1.2 A.

TABLE 1

Relationship between resistive value and corresponding user-defined current limit.

| Signal | $I_{SET}$ | User-Defined Current Limit | $R_{SET}$ | $V_{SET} = I_{SET} \times R_{SET}$ |
| --- | --- | --- | --- | --- |
| EN8 = S1 | 1 µA | 1.2 A | 1.5 MΩ | 1.5 V |
|  | 1 µA | 600 mA | 750 kΩ | 0.75 V |
| EN4 = S1 + S2 | 2 µA | 600 mA | 750 kΩ | 1.5 V |
|  | 2 µA | 300 mA | 375 kΩ | 0.75 V |
| EN2 = S1 + S2 + S3 | 4 µA | 300 mA | 375 kΩ | 1.5 V |
|  | 4 µA | 150 mA | 187.5 kΩ | 0.75 V |
| EN1 = S1 + S2 + S3 + S4 | 8 µA | 150 mA | 187.5 kΩ | 1.5 V |
|  | 8 µA | 75 mA | 93.75 kΩ | 0.75 V |

The total detection current, $I_{SET}$, flowing through the load switch device may be changed in one or more steps. The embodiment illustrated in Table 1 allows for step-wise detecting the current limit by step-wise decreasing the total current flowing. Such step-wise detection may be obtained by including multiple current paths in the load switch device, where $I_{SET}$ comprises the sum of the currents flowing on each of the current paths. Also, each current path may include a current switch (e.g., a transistor T1, T2, T3, T4) which can cause the current on that path to start or stop flowing as the respective transistor is turned ON or OFF. The embodiment outlined in Table 1 includes four current paths. The signals to turn ON the transistors (T1, T2, T3, and T4) are denoted S1, S2, S3, and S4, respectively. A state of the load switch device is the status of the signals controlling the transistors, i.e., the set (S1, S2, S3, S4). An enable signal (EN) defines the state, i.e., which of the individual signals are activated. The current, I1, flowing on the current path whose transistor T1 is controlled by signal S1 is 1 μA, The currents I2, I3, and I4 flowing on the current paths with transistors T2, T3, and T4, respectively, are 1 μA, 2 μA, and 4 μA, respectively.

For example, a first enable signal (EN1) may be defined as S1+S2+S3+S4. When turned ON, the transistors T1-T4 allow the associated current I1-I4 to flow, and when turned OFF, the transistor T1-T4 interrupts the current flowing on the associated current path. Thus, EN1 may cause all four transistors to be turned ON. In this case, the total current of 8 μA consists of a sum of currents I1, I2, I3 and I4 which flow through transistors T1-T4 when turned ON by the signals S1-S4. As noted, the current limits are user defined. If the designer chooses the resistive value, $R_{SET}$, as 93.75 kΩ, the current limit is set, per Table 1, at 75 mA. If the designer chooses the resistive value as 187.5 kΩ, the current limit is set at 15.0 mA. The designer may set the current limits, for example, based on one or more applications for the load switch device in which the current limit detector is to be incorporated.

The step-wise current limit detection may be obtained by, in a first step, activating all of S1-S4, causing the total detection current, $I_{SET}$, to initially be 8 μA. Thereafter, in a second step, S4 may be deactivated, causing the total current to be limited to 4 μA (i.e., to I1+I2+I3=1 μA+1 μA+2 μA). In a third step, S3 may be also deactivated, causing the total current to be limited to I1+I2, i.e., 2 μA. Further step-wise decrease may be obtained by deactivating S2 and thereafter S1, causing the current to be decreased to I1 (i.e., 1 μA) and thereafter to 0 μA or to substantially 0 μA (e.g., with bias currents alone or with no bias currents). Other step-wise decreases are possible. Various other sequences of step-wise decreases, and thus step-wise detection of the current limit, are possible. Such step-wise detection may further include various levels of step granularity or current increments.

Another enable signal (EN8) may be defined as S1. Using EN8, only one current path, i.e., I1, can be turned ON and OFF. Thus, the step-wise current limit detection may be limited to two steps. Yet other enable signals may include EN2 defined as S1+S2+S3, and EN4 defined as S1+S2. The number of possibilities of step-wise decreasing the current decreases as the number of signals (Sj, j=1, 2, 3, and 4) included in the enable signal decreases. However, even using EN8, comprising S1 alone, the current may be step-wise limited by first activating S1, causing the current to be limited to 1 μA and thereafter deactivating S1, causing the current to be limited to 0 μA (including no bias currents, as will be further described below).

Typically, an embodiment includes a single resistive device of a single resistive value. Therefore, typically only the parameters in one of the rows of Table 1 are applicable to any one embodiment. Other embodiments are possible. For example, an embodiment may include two or more resistive devices operating in parallel. Such embodiment may allow for a user application to select between the resistive devices via, for example, a select signal output from the user application.

FIG. 7 is a schematic of a current limit detector 700, according to one embodiment of the present invention. The current limit detector 700 comprises a high-level comparator, COMP1, a low-level comparator, COMP2, a resistive device $R_{SET}$, three resistors R1, R2, and R3, a high reference voltage terminal, H, a low reference voltage terminal, L, a supply terminal, S, a terminal A leading to connection point A, four current switches (e.g., transistors) T1-T4, and four current paths adapted to conduct currents I1-I4, respectively. The supply terminal, S, provides 2.0 V. The values of the resistors R1-R3 are set based on desired threshold voltages at the two reference voltage terminals H and L, relative to the voltage at the supply terminal, S. The method for setting the values of the resistors can be any one of a number of suitable methods, including pre-selecting fixed R value, pre-setting a variable resistor, etc.

In the illustrated embodiment, the high and low threshold voltages are 1.5 V and 0.12 V, respectively. The high reference voltage terminal, H, (at 1.5 V) is operatively coupled to one input of the high-level comparator COMP1. The low reference voltage terminal, L, at 0.12 V is operatively coupled to one input of the low-level comparator COMP 2. Another input of each of COMP1 and COMP2 is operatively coupled to connection point A (or simply "point A") via terminal A. The outputs of the comparators indicate whether the voltage at point A is within the working voltage range 0.12 V-1.5 V or outside this range. Point A denotes a junction in the current limit detector circuitry where all the current paths meet and at which the currents I1-I4 from all the current paths combine to form the sum, $I_{SET}$, ($I_{SET}$=I1+I2+I3+I4). The resistive device, $R_{SET}$, is connected between terminal A (or point A) and ground. The voltage at terminal A is the voltage drop across the resistive device, i.e., $I_{SET} \times R_{SET}$.

The high-level comparator COMP1 is operative to compare the voltage, $V_{SET}$, at point A with the high threshold voltage 1.5 V and to output a signal responsive to whether $V_{SET}$ exceeds 1.5 V. The low-level comparator COMP2 is operative to compare $V_{SET}$ with the low threshold voltage 0.12 V and to output a signal responsive to whether $V_{SET}$ is below 0.12 V. The output signals from one or both of COMP1 and COMP2 are used to determine which of S1-S4 to activate. As described with reference to Table 1, S1-S4 determine which transistors T1-T4 to turn ON and thus which of currents I1-I4 may flow via the respective current paths. The comparators may be, for example, positive feedback operating amplifiers.

FIG. 7 does not show the details of logic adapted to accept as inputs the outputs from one or both of COMP1 and COMP2 and to generate S1-S4. However, various implementations of such logic are possible and the particulars of such implementations may vary. Such variations may depend, for example, on how the enable signals are defined. In some embodiments, the enable signals may be defined with reference to signals that turn the transistors OFF rather than ON. For example, S1-S4 may denote signals that turn the transistors ON, and S1B-S4B may denote signals that turn transistors T1-T4, respectively, OFF.

In this embodiment, S1 is coupled to and operative to turn ON transistor T1, thereby causing current I1 of 1 μA to flow. Likewise, S2, S3, and S4 are respectively coupled to and operative to turn ON transistors T2, T3, and T4, thereby correspondingly causing currents I2, I3, and I4 of 1 μA, 2 μA, and 4 μA to flow. T1-T4 may include transistors or any other type of current switch. Examples of transistors include field effect transistors (FETs) such as junction FETs (JFETs) and metal oxide semiconductor FETs (MOSFETs), bipolar junction transistors (BJTs), and any combination thereof.

In operation, the current limit detection starts with turning ON all four current paths so that the current, $I_{SET}$, is 8 μA. If, for example, $R_{SET}$ is 1.5 MΩ, the voltage at terminal A, $V_{SET}$, is 12 V (1.5 MΩ×8 µA=12 V), which is above the threshold voltage 1.5 V. The output of COMP1 will be TRUE, because the condition $V_{SET}$>1.5 V is met. The output of COMP2 will also be FALSE, because the condition $V_{SET}$<0.12 V is not met. The output of COMP1 may cause one or more of T1-T4 to be turned ON or OFF, depending on how the enable signal and S1-S4 are defined.

If Table 1 applies, EN1 is defined as S1+S2+S3+S4, and EN2 is defined as S1+S2+S3. This means that the current limit detector responds by deactivating S4 in order to turn OFF T4 and reduce the current, $I_{SET}$, to 4 µA (I1+I2+I3=1 µA+1 µA+2 µA=4 µA). Following the reduction in $I_{SET}$, the voltage at terminal A, $V_{SET}$, is 6 V (1.5 MΩ×4 µA=6 V) which is still above the threshold voltage 1.5V. The output of COMP1 is still TRUE, and the current limit detector responds by enabling EN4=S1+S2, i.e., by deactivating S3 to turn off T3 and reduce $I_{SET}$ to 2 µA (I1+I2=1 µA+1 µA=2 µA). Following this reduction, $V_{SET}$ is 3 V (1.5 MΩ×2 µA=3 V). The current detector responds again, reducing the current by turning OFF T2 to enable EN8=S1. The resulting current, $I_{SET}$, is 1 µA (I1 alone), which causes $V_{SET}$ to be 1.5V.

At this point, $V_{SET}$ falls within the operating range, and the condition of COMP1 is FALSE. Likewise, the condition of COMP2 is FALSE, because $V_{SET}$ (1.5V) is not <0.12V. According to Table 1, the current limit thus detected is 1.2 A. The current limit detector communicates the current limit of 1.2 A to the current limit controller.

Assuming that $I_{SET}$ is initially 8 µA, if $R_{SET}$ is instead to 200 kΩ, the voltage drop, $V_{SET}$, across the resistive device is 1.6 V. Because this voltage drop exceeds the high threshold, i.e., $V_{SET}$ (1.6 V)>1.5 V, the COMP1 output switches to TRUE, and the current is limited to 4 µA. With this lower current, the voltage drop across $R_{SET}$ decreases to 0.8 V (at point A 200 kΩ×4 µA=0.8 V). In response, the COMP1 output may change to FALSE (i.e., return to its former output), because the condition $V_{SET}$>1.5 V becomes FALSE again. To avoid or mitigate oscillations, one or both comparators may use hysteresis. Hysteresis may also be used to avoid or mitigate oscillations due to noise or other forms of interference.

The output of a comparator (e.g., COMP1, COMP2) corresponding to FALSE may be HIGH or LOW depending on the inputs to the comparator being respectively set as ± or ∓. For example, ± may correlate to an N-channel transistor (e.g., a PNP-type BJT) and ∓ to a P-channel transistor (e.g., an NPN-type BJT). Other relationships between the comparator output and its inputs are possible.

In some embodiments, one or more current paths may include no current switch. For example, S1 and T1 may be omitted and the current I1 may always flow. However, at least one current path operatively coupled to a current switch is necessary in order to obtain step-wise current limit detection. Some embodiments may be implemented with more or fewer Sj signals and/or with more or fewer current switches and current paths than illustrated in FIG. 7.

Some embodiments may include only a high-level comparator, i.e., COMP1. In such embodiments, the low-level comparator COMP2, the resistor R2, and the low reference voltage terminal, L, may be omitted. In such configurations, there is no current limit in the event of a short circuit event during which, in effect, $R_{SET}$ equals 0Ω to ground. The selection of low threshold voltage for COMP2 may be based on criteria including noise immunity. In the embodiment illustrated in FIG. 7, the low threshold voltage selected for the low-level comparator COMP2 is 0.12 V. In alternative embodiments, another non-zero value may be selected, such as 80 mV. Some level of electronic noise exists in all circuits and devices as a result of thermal noise. Random variations in current or voltage may be caused by random movement of the electrons carrying the current as the electrons are jolted around by thermal energy. This phenomenon may limit the minimum signal level to which a circuit may respond, because some amount of thermal noise may arise in the input circuits. Noise immunity criteria can take into account such phenomena.

In some embodiments, the resistive value may be substantially zero, i.e., $R_{SET}$ is in essence a short circuit. In such embodiments, there is no current limit because a short circuit corresponds to virtually infinite current. Other embodiments may be designed without a resistive device. In such embodiments, an open circuit exists in lieu of $R_{SET}$. The current limit detector may, upon detection of an open circuit, determine that a fixed current limit applies. The fixed current limit may be the highest or the lowest current limit or any other fixed current limit as determined during the design phase of the current limit detector. Because $R_{SET}$ is virtually infinite in an open circuit, in operation, the current limit detector may detect the open circuit as the condition of COMP1 always being TRUE. The current limit detector may then identify the resistor as missing, e.g., to the load switch application. The load switch application may thereupon set the current limit. In other embodiments, the current detector may identify the open circuit and communicate a stored current limit associated therewith to the current limit controller.

The low threshold voltage, illustrated in FIG. 7 as 0.12 V, may be used for noise immunity purposes. Thus, if the condition for COMP2 is detected as TRUE, the voltage $V_{SET}$ is below 0.12 V and the current limit detector may communicate to the current limit controller that there is no current limit.

FIG. 7 illustrates one implementation of a single current limit detector 302 and a single resistive device. Various embodiments may be implemented with one or more resistive devices having different resistive values, one or more current limit detectors 302, or a combination thereof, as described with reference to FIGS. 3 and 4.

FIG. 8 is an exemplary graph of current, $I_{SET}$, over time with $R_{SET}$ of 1 MΩ as current switches included in the current limit detector of FIG. 7 are successively activated, according to one embodiment of the present invention. Graph (a) illustrates how $I_{SET}$ decreases step-wise from an initial value of 8 µA. As the individual current switches are turned OFF, one at a time, they cause current on a current path to stop flowing. As described with reference to FIG. 7, S4B is the opposite polarity to S4, and in graph (c) S4B is activated. When S4B is activated, T4 is therefore turned OFF, causing I4 to stop flowing. Currents I1, I2, and I3 continue to flow, causing the total current $I_{SET}$ to be limited to 4 µA (1 µA+1 µA+2 µA). Graph (a) shows $I_{SET}$ dropping to 4 µA.

According to graph (d), S3B is thereafter activated, causing T3 to be turned OFF and I3 to stop flowing. Graph (a) shows $I_{SET}$ dropping to 2 µA (I1+I2=1 µA+1 µA) in response thereto. Graph (e) shows S2B thereafter being activated, causing I2 to stop flowing and $I_{SET}$ (in graph (a)) to drop to 1 µA (i.e., I1).

Note that the embodiment whose operation is illustrated in FIG. 8 omits the current switch for turning the current I1 ON and OFF. Therefore, there is no S1B signal, and the $I_{SET}$ current (I1, i.e., 1 µA) is ON continuously until current OFF (COFF) logic is activated (e.g., applied, inserted). An embodiment of COFF logic is shown in the lower portion of FIG. 9. Some embodiments may include COFF logic operative to indicate that an end of the detect sequence has been reached (i.e., that the detect sequence has completed) and that the current limit detector is dormant. In the illustrated embodiment, the end of the detect sequence is reached when S2B-S4B are all active, i.e., when $I_{SET}$ is 1 µA. Thus, graph (b) (FIG. 8) illustrates that the lower end 1 µA of the current range is detected, causing the COFF logic to be active (e.g., HIGH). COFF logic is operative to turn OFF substantially all of the bias currents in the current limit detector when the current limit detector is dormant. In the illustrated embodiment, the COFF logic is coupled to the I1 current path and operative to turn OFF also I1 of 1 µA. In response, $I_{SET}$ in graph (a) is reduced to a current substantially equal to zero. In other embodiments, all current paths may include current switches operative to turn OFF the current flowing. In such embodiments, the COFF logic may be operative to turn OFF substantially all bias currents but not to turn OFF any current paths that do not include a transistor. In such an embodiment (not shown), upon activating the COFF logic, the resulting total current would likewise be substantially zero.

FIG. 8 also illustrates that in order to detect the current limit in steps (other than a single step of simply turning OFF all currents, e.g., via the COFF logic), it is necessary for the load switch device to include at least one current path with a transistor and a corresponding signal SjB (or Sj) controlling whether such transistor is turned ON or OFF.

The current limit detector (e.g., the current limit detector 700 in FIG. 7) may be implemented in a number of ways. One implementation is shown in FIG. 9, which illustrates a current limit detection circuit according to one embodiment of the present invention. As shown, the high-level comparator COMP1 is operatively connected to internal delay elements (denoted FF1-FF3). The delay elements are operatively coupled to each other in series and operative to, serially, maintain a sequence of states. The output of a particular delay element (e.g., FF1) is adapted to cause a change to the state of a delay element that follows it in the series (e.g., FF2). Each state defines which of the one or more transistors are to be turned ON and which are to be turned OFF. The delay elements may be flip-flop registers (FFs). Examples of FFs include D-FFs and JK FFs.

Including the internal delay elements in the current limit detector allows for a comparator (e.g., COMP1, COMP2, or both) to remember a sequence of a length which is based on the number of FFs included. In the illustrated embodiment, the current limit detector includes three FFs (i.e., FF1, FF2, and FF3) operatively coupled to COMP1, and thus the current limit detector is adapted to remember a sequence of length three (with respect to the operation of COMP1). In alternative embodiments, more or fewer delay elements may be included. As the number of delay elements increases, so does the length of the sequences that may be remembered and, in turn, the obtainable current resolution. For example, in an embodiment as defined as in Table 1, the sequence of states allows for a step-wise decrease of $I_{SET}$ from a first state in which 8 µA (all of I1-I4) is flowing to a second state in which 4 µA (I1-I3 but not I4) is flowing and from the second to a third state in which 2 µA (I1 and I2 but not I3 and I4) is flowing.

In one embodiment, the delay elements prevent race conditions. Race conditions may otherwise occur if, for example, the output of one delay element in the series becomes critically dependent on the sequencing and/or timing of other events such as when inputs to logic gates, such as the FFs, vary. For example, the output of FF2 in FIG. 9 depends on the state of its inputs. As the inputs change state, a finite delay may occur before the output changes. For a brief period, the output may change to an unwanted state before settling back to the designed state. In general, certain electronic systems are able to tolerate such glitches. However, if for example the output signal functions as a clock for other elements that contain memory (e.g., FF3), the current limit detector may rapidly depart from its designed behavior. In effect, the temporary glitch may become permanent.

The delay elements advantageously allow for the sequence of state transitions to be clocked. For example, by activating (e.g., enabling) the delay elements in order of operation (i.e., FF1, then FF2, and thereafter FF3), FF1 is not activated until its inputs are stable. FF2 may be activated a short period thereafter, such period being sufficient to allow for the output of FF1 to become stable. Because the output of FF1 also affects the inputs to FF2, the inputs to FF2 are stable when FF2 is activated. Likewise, FF3 may not be activated until its inputs, affected by the output of FF2, are stable. This results in clocking of the sequence resembling a ripple clock. There is thus no need for the current limit detector to include a clock oscillator. After three such clock cycles, the delay elements are stable and the delay enable input (denoted DEX in FIG. 9) is in the OFF state, which disables the delay elements. Other embodiments may include a state machine in lieu of the delay elements. However, the circuitry illustrated in FIG. 9 may be preferred because of its zero dynamic current consumption. In an alternative embodiment, the circuitry denoted 902 may be implemented using a state machine.

FIG. 9 also illustrates an implementation of COFF logic adapted to produce a COFF output signal. Such COFF output signal can be used to turn OFF substantially all bias currents, as described with reference to FIG. 8.

Values, such as the 1.5 V reference voltage, i.e., the high threshold voltage (or state trip point) associated with COMP1, may vary because of resistor tolerance (e.g., of one or more of the resistors R1-R3). Examples of resistor tolerance include 5%, 10%, and more. The threshold voltage value may further vary due to variations in rail voltage (i.e., voltage provided by the supply, such as the power supply unit). Likewise, the 0.12 V reference voltage, i.e., the low threshold voltage, may vary because of resistor tolerance, variations in rail voltage, or both. In the embodiments of FIGS. 7 and 9, the rail voltage is 2.0 V.

Figure 10:
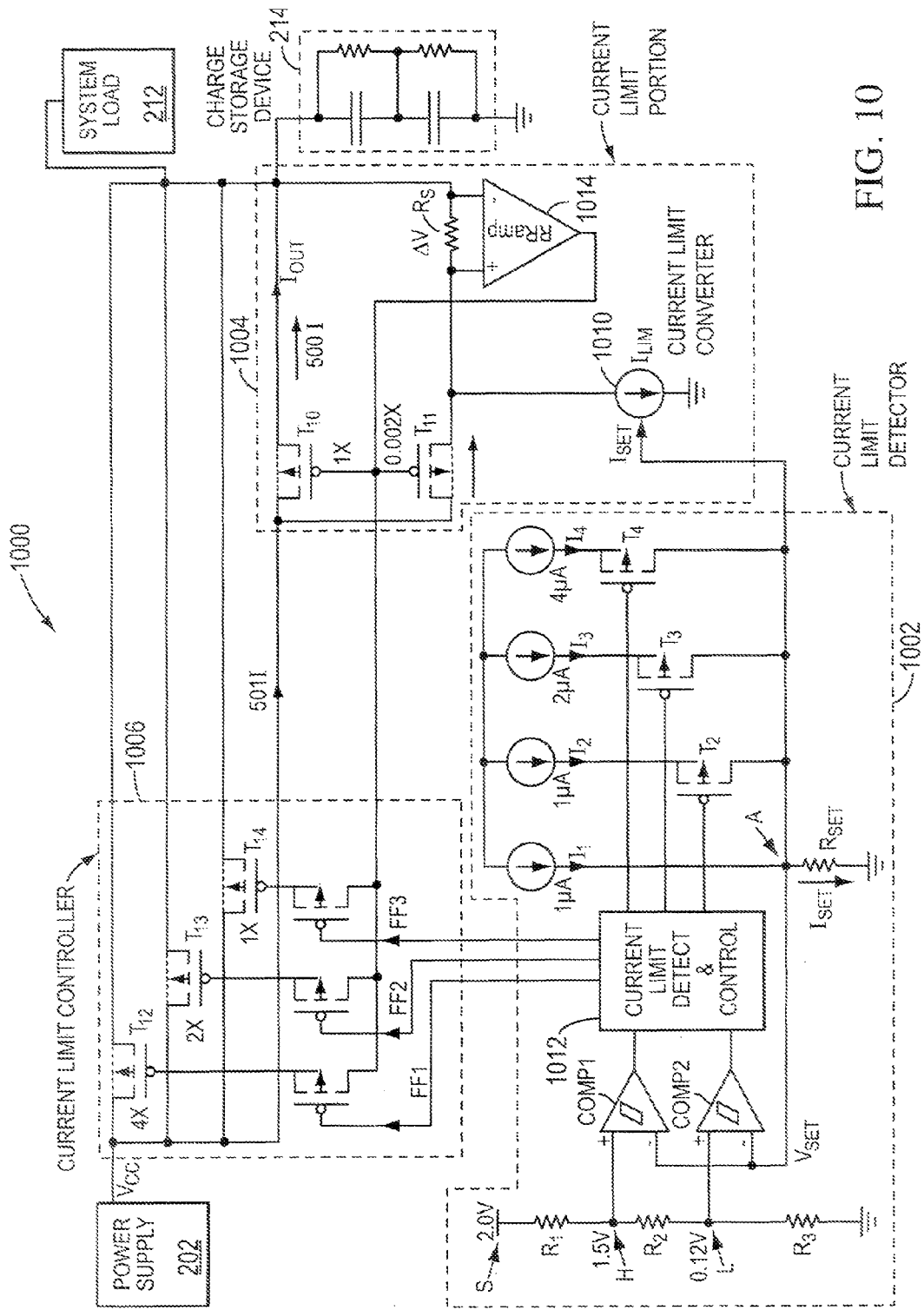
FIG. 10 illustrates circuit details of a load switch device, according to one embodiment of the present invention.

FIG. 10 shows an apparatus 1000 for controlling a current limit, including a current limit detector 1002, according to one embodiment of the present invention. The apparatus 1000 comprises the current limit detector 1002, a current limit portion 1004, a current limit controller 1006, the system load 212, and the charge storage device 214.

The current limit detector 1002 is substantially similar to the current limit detector of FIG. 7 or 9, except that, compared to the embodiment of FIG. 7, the current limit detector 1002 includes no transistor T1. In the absence of T1, the current I1 always flows. In some embodiments, terminal A is not directly connected to the resistive device but rather to a current limit converter 1010 included in the current limit portion 1004. The current limit converter 1010 is operative to convert voltage to current. The current limit converter 1010 may be used to charge circuits as shown in FIG. 10 or any load switch device.

The current limit detect and control component 1012 includes the aforementioned delay elements FF1-FF3 of FIG. 9. The current limit controller 1006 is operatively coupled to the current limit detect and control component 1012, to the current limit portion 1004, as well as to the system load 212 and the charge storage device 214. The outputs of the delay elements are fed to the current limit controller 1006. In some embodiments, the charge storage device 214 may be external to and adapted to cooperate with the apparatus 1000.

The current limit controller 1006 is operative to, upon receiving the detected current limit from the current limit detector 1002, control the current, $I_{OUT}$, output to the system load 212 and charge storage device 214 so as not to exceed the detected current limit. Such limitation may be performed in a controlled manner, for example, in incremental steps. Such manner may be gradual or fast depending on, for example, the number of delay elements included in the current limit detect and control component 1012. The current limit controller 1006 may include scaled transistors T12, T13, and T14. In this embodiment, T12 is scaled 4×, T13 is scaled 2×, and T14 is scaled 1×. The size ratio between the scaled transistors may correspond to the respective ratios of the current switches T1-T4. For example, T12 may be scaled 4× corresponding to the scaling of T4 relative to T1 (4 μA vs. 1 μA). Size matching may be important to match transistor criteria, for transistor scaling (i.e., decreasing device dimensions), and the like. Transistors of a particular scale (i.e., size) are typically laid out in the same region on the IC die.

The current limit portion 1004 includes the current limit converter 1010, an operational amplifier 1014, transistors T10 and T11, and a current sensing resistor $R_S$. The transistors T10 and T11 are scaled. In this embodiment, T10 is scaled 1× and T11 is scaled 0.002×. The currents I and $I_{OUT}$ have a substantially fixed ratio between them determined by the size ratio of T10 and T11. In the illustrated embodiment, that size ratio is 500 (1/0.002=500). T11 is thus a current mirror to T10.

If the current, I, flowing through T11 is greater than the current limit, $I_{LIM}$, of the current limit converter 1010, the operational amplifier 1014 tries to reduce the current until I substantially equals $I_{LIM}$. If I is below $I_{LIM}$, the operational amplifier 1014 substantially maintains I at or below $I_{LIM}$. The value of $I_{LIM}$ may be, for example 500×I.

The apparatus 1000 or portions thereof, such as the current limit detector (e.g., current limit detector 1002 or that illustrated in FIG. 7 or 9), may be implemented in a number of ways. It may be implemented using discrete components or, preferably, it may be embodied in an integrated circuit (IC) or as a functional block in an IC. Such IC may further be adapted for use in a mobile device. Examples of mobile devices include laptops, cell phones, personal digital assistants (PDAs), game boys, other battery-operated toys, and the like.

In sum, although the present invention has been described in considerable detail with reference to certain preferred, versions thereof, other versions are possible. Therefore, the spirit and scope of the appended claims should not be limited to the description of the preferred versions contained herein.

What is claimed is:

1. A device for detecting one or more current limits, comprising:
   a detector including a current limit detector operative to detect a user-defined current limit;
   multiple resistive devices coupled to the current limit detector, each resistive device being adapted to conduct a sum of currents which produces a voltage drop across it and each being associated with a respective user-defined current limit; and
   a selection switch coupled to the multiple resistive devices and operative to select one of the multiple resistive devices in response to a select signal,
   wherein the detector is adapted to provide any user-defined current limit which the current limit detector is operative to detect, based on the sum of currents conducted through a selected one of the multiple resistive devices, by step-wise decreasing such sum of currents.

2. A device as in claim 1, wherein the detector is further operative to communicate the detected user-defined current limit to a current limit controller.

3. A device as in claim 1, wherein each of the multiple resistive devices includes a ground terminal and wherein the selection switch is coupled to the ground terminal of each of the multiple resistive devices.

4. A device as in claim 1, wherein the selection switch is further operative to select a different one of the multiple resistive devices in response to a change in the select signal.

5. A device as in claim 1, wherein each of the multiple resistive devices includes a resistor.

6. A device as in claim 1, wherein the current limit detector includes:
   a plurality of current paths each of which being adapted to conduct current and at least one of which including a current switch operable to interrupt current conduction therethrough, wherein, collectively, currents flowing through the plurality of current paths combine to produce the sum of currents,
   a high reference voltage terminal operative to supply a high threshold voltage, and
   a high-level comparator including inputs and an output, one of the inputs being operative to receive the high threshold voltage and another one of the inputs being operatively coupled to the selected one of the multiple resistive devices, the high-level comparator producing at the output a signal responsive to a comparison between the voltage drop and the high threshold voltage, the output being adapted to operate the current switch to step-wise detect the user-defined current limit associated with the sum of currents by step-wise decreasing such sum of currents,
   wherein the terminal of each of the multiple resistive devices coupled to the current limit detector is coupled to the plurality of current paths.

7. A device as in claim 6, wherein an amount of the current being conducted on each current path is based on a scale of its respective current switch.

8. A device as in claim 6, wherein the comparison between the voltage drop and the high threshold voltage includes determining whether the voltage drop exceeds the high threshold voltage.

9. A device as in claim 6, wherein each current path is further adapted to conduct current of an amount specific to it.

10. A device as in claim 1 embodied in an integrated circuit (IC) or as a functional block in the IC.

11. A device as in claim 10, wherein the IC is adapted for use in a mobile device.

12. A device as in claim 1, wherein the detector further comprises a memory operatively coupled to the current limit detector and operative to store the detected user-defined current limit.

13. A device for detecting one or more current limits, comprising:
   a detector including multiple current limit detectors, each operative to detect a respective user-defined current limit;
   multiple resistive devices each coupled to a respective one of the multiple current limit detectors, each having a resistive value associated with the respective user-defined current limit and each being adapted to conduct a respective sum of currents which produces a voltage drop across it; and
   a selection switch coupled to each of the multiple current limit detectors and operative to select any one of the multiple current limit detectors in response to a select signal,
   wherein the detector is adapted to provide any user-defined current limit which the multiple current limit detectors are operative to detect, based on the respective sum of currents being conducted through a resistive device of the selected one of the multiple current limit detectors, by step-wise decreasing such respective sum of currents.

14. A device as in claim 13, wherein the resistive value is predetermined based on the user-defined current limit.

15. A device as in claim 13, wherein each current limit detector is further operative to communicate the detected respective user-defined current limit to a current limit controller in response to the select signal.

16. A device as in claim 13, wherein each of the multiple resistive devices includes terminals, including a ground terminal, and is coupled to ground at its ground terminal and at another of its terminals to its respective one of the multiple current limit detectors.

17. A device as in claim 13, wherein each of the multiple resistive devices includes a resistor.

18. A device as in claim 13, wherein each of the current limit detectors includes:
 a plurality of current paths each of which being adapted to conduct current and at least one of which including a current switch operable to interrupt current conduction therethrough, wherein, collectively, currents flowing through the plurality of current paths combine to produce a respective sum of currents,
 a high reference voltage terminal operative to supply a high threshold voltage, and
 a high-level comparator including inputs and an output, one of the inputs being operative to receive the high threshold voltage and another one of the inputs being operatively coupled to its respective resistive device, the high-level comparator producing at the output a signal responsive to a comparison between the voltage drop and the high threshold voltage, the output being adapted to operate the current switch to step-wise detect the respective user-defined current limit associated with the respective sum of currents by step-wise decreasing such respective sum of currents,
 wherein the terminal of each of the multiple resistive devices coupled to the respective one of the multiple current limit detectors is coupled to the respective plurality of current paths.

19. A device as in claim 18, wherein an amount of the current being conducted on each current path is based on a scale of its respective current switch.

20. A device as in claim 18, wherein the comparison between the voltage drop and the high threshold voltage includes determining whether the voltage drop exceeds the high threshold voltage.

21. A device as in claim 18, wherein each current path is further adapted to conduct current of an amount specific to it.

22. A device as in claim 13 embodied in an integrated circuit (IC) or as a functional block in the IC.

23. A device as in claim 22, wherein the IC is adapted for use in a mobile device.

24. A method for detecting one or more current limits, comprising:
 selecting a resistive device based on a select signal received from a selection switch, the selected resistive device being one of multiple resistive devices, each having a resistive value associated with a respective user-defined current limit and each being adapted to conduct a respective sum of currents; and
 detecting, at a current limit detector, the user-defined current limit associated with the selected resistive device,
 wherein the user-defined current limit is detected based on the sum of currents being conducted through the selected resistive device by step-wise decreasing such sum of currents.

25. A method as in claim 24, wherein the resistive value is predetermined based on the user-defined current limit.

26. A method as in claim 24, further comprising communicating the detected user-defined current limit to a current limit controller.

27. A method as in claim 24, further comprising selecting a different one of the multiple resistive devices in response to a change in the select signal.

28. A method as in claim 24, further comprising:
 comparing a voltage drop and a high threshold voltage, the voltage drop being a product of a plurality of currents flowing through a plurality of current paths and combining into a sum of currents flowing through the selected resistive device, the resistive value of the selected resistive devices being set to establish a relationship between the sum of currents and the user-defined current limit associated with the selected resistive device, each current path being adapted to conduct current and at least one of which including a current switch operable to interrupt current conduction therethrough;
 establishing the relationship between the sum of currents and the user-defined current limit of the selected resistive device by operating one or more of the current switches step-wise in response to the comparing; and
 detecting the user-defined current limit of the selected resistive device associated with the sum of currents.

29. A method as in claim 24, further comprising storing the detected user-defined current limit in a memory operatively coupled to the current limit detector.

30. A method for detecting one or more current limits, comprising:
 selecting a current limit detector based on a select signal received from a selection switch, the selected current limit detector being any one of multiple current limit detectors in a detector, each of the multiple current limit detectors including a resistive device of a predetermined resistive value associated with a respective user-defined current limit and adapted to conduct a respective sum of currents; and
 detecting, at the selected current limit detector, the respective user-defined current limit,
 wherein the respective user-defined current limit is detected based on the sum of currents being conducted through the respective resistive device by step-wise decreasing such sum of currents.

31. A method as in claim 30, further comprising communicating the detected user-defined current limit to a current limit controller.

32. A method as in claim 30, further comprising selecting a different one of the multiple current limit detectors in response to a change in the select signal.

33. A method as in claim 30, further comprising:
 comparing, at the selected current limit detector, a voltage drop and a high threshold voltage, the voltage drop being a product of a plurality of currents flowing through a plurality of current paths and combining into the sum of currents flowing through the selected resistive device, the selected resistive device being the particular resistive device included in the selected current limit detector, the predetermined resistive value of the selected resistive device being set to establish a relationship between the sum of currents and the user-defined current limit associated with the selected current limit detector, each current path being adapted to conduct current and at least one of which including a current switch operable to interrupt current conduction therethrough;

establishing the relationship between the sum of currents and the user-defined current limit of the selected current limit detector by operating, at the selected current limit detector, one or more of the current switches step-wise in response to the comparing; and detecting the user-defined current limit of the selected current limit detector associated with its sum of currents.

34. An apparatus for detecting one or more current limits, comprising:

a detector operative to detect a user-defined current limit;

multiple resistive devices, each having a resistive value associated with a respective user-defined current limit and each adapted to conduct a sum of currents which produces a voltage drop across it;

a selection switch operative to select one of the multiple resistive devices in response to a select signal; and a current limit controller operatively coupled to the detector and being operative to limit an output current so as not to exceed the detected user-defined current limit, wherein the detector is adapted to detect a user-defined current limit, based on the sum of currents being conducted through the selected one of the multiple resistive devices, by step-wise decreasing such sum of currents.

35. An apparatus as in claim 34, further comprising a memory operatively coupled to the detector and operative to store the detected user-defined current limit.

36. An apparatus as in claim 34, wherein the detector includes:

a plurality of current paths each of which being adapted to conduct current and at least one of which including a current switch operable to interrupt current conduction therethrough, wherein, collectively, currents flowing through the plurality of current paths combine to produce the sum of currents;

a high reference voltage terminal operative to supply a high threshold voltage; and a high-level comparator including inputs and an output, one of the inputs being operative to receive the high threshold voltage and another one of the inputs being operatively coupled to the selected one of the multiple resistive devices, the high-level comparator producing at the output a signal responsive to a comparison between the voltage drop and the high threshold voltage, the output being adapted to operate the current switch to step-wise detect the user-defined current limit associated with the sum of currents by step-wise decreasing such sum of currents, wherein the terminal of each of the multiple resistive devices coupled to the current limit detector is coupled to the plurality of current paths.

37. An apparatus as in claim 34, wherein the detector includes multiple current limit detectors, each of which includes:

a plurality of current paths each of which being adapted to conduct current and at least one of which including a current switch operable to interrupt current conduction therethrough, wherein, collectively, currents flowing through the plurality of current paths combine to produce a respective sum of currents;

a high reference voltage terminal operative to supply a high threshold voltage; and a high-level comparator including inputs and an output, one of the inputs being operative to receive the high threshold voltage and another one of the inputs being operatively coupled to its respective resistive device, the high-level comparator producing at the output a signal responsive to a comparison between the voltage drop and the high threshold voltage, the output being adapted to operate the current switch to step-wise detect the respective user-defined current limit associated with the respective sum of currents by step-wise decreasing such respective sum of currents, wherein the terminal of each of the multiple resistive devices coupled to the respective current limit detector is coupled to the respective plurality of current paths.

38. An apparatus as in claim 34, wherein limiting the output current includes outputting, at the current limit controller, a sequence of control signals each of which being associated with one step in the limitation of the output current, and further comprising a current limit portion operatively coupled to the current limit detector and to the current limit controller and operative to regulate the output current in response to the sequence of control signals received from the current limit controller.

39. An apparatus as in claim 34, further comprising a charge storage device adapted to cooperate with the current limit controller and to provide an energy reservoir capable of supplying burst power.

* * * * *